United States Patent
Teyeb et al.

(10) Patent No.: US 11,039,488 B2
(45) Date of Patent: Jun. 15, 2021

(54) ADAPTATION LAYER SETUP AND CONFIGURATION IN INTEGRATED ACCESS BACKHAULED NETWORKS

(71) Applicant: Telefonaktiebolaget LM Ericsson (publ), Stockholm (SE)

(72) Inventors: Oumer Teyeb, Solna (SE); Gunnar Mildh, Sollentuna (SE); Ajmal Muhammad, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 174 days.

(21) Appl. No.: 16/474,264

(22) PCT Filed: Apr. 4, 2019

(86) PCT No.: PCT/SE2019/050311
§ 371 (c)(1),
(2) Date: Jun. 27, 2019

(87) PCT Pub. No.: WO2019/194737
PCT Pub. Date: Oct. 10, 2019

(65) Prior Publication Data
US 2021/0127430 A1 Apr. 29, 2021

Related U.S. Application Data

(60) Provisional application No. 62/653,313, filed on Apr. 5, 2018.

(51) Int. Cl.
*H04W 76/10* (2018.01)
*H04L 29/08* (2006.01)
(Continued)

(52) U.S. Cl.
CPC ........... *H04W 76/10* (2018.02); *H04L 67/141* (2013.01); *H04W 88/04* (2013.01); *H04W 88/08* (2013.01)

(58) Field of Classification Search
CPC ..... H04W 76/10; H04W 88/08; H04W 88/04; H04L 67/141
See application file for complete search history.

(56) References Cited

U.S. PATENT DOCUMENTS 10,432,295 B2 * 10/2019 Majmundar .......... H04L 45/123
2002/0082014 A1 * 6/2002 Andersson ............ H04W 36/12
455/436
(Continued)

FOREIGN PATENT DOCUMENTS

EP 2981026 A1 2/2016
WO 2016181094 A1 11/2016

OTHER PUBLICATIONS

3GPP, "3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V15.1.0, Mar. 2018, pp. 1-52.
(Continued)

*Primary Examiner* — Brenda H Pham
(74) *Attorney, Agent, or Firm* — Murphy, Bilak & Homiller, PLLC

(57) ABSTRACT

Configuring an adaptation layer in a relay node communicates with a central unit of a donor base station through a distributed unit of the donor base station comprises connecting (3402) to the donor base station, after establishing the connection, configuring (3404) an adaptation layer in a protocol stack for an MT part of the relay node, the adaptation layer providing for routing of incoming packets to one or more further relay nodes or to one or more user equipments, UEs, connected to the relay node and for mapping of those incoming packets to bearers, and, after configuring the adaptation layer for the MT part of the relay node, configuring (3406) an adaptation layer for the distributed unit part of the relay node for forwarding packets exchanged between
(Continued)

the central unit of the donor base station and the first further relay node downstream of the relay node.

24 Claims, 27 Drawing Sheets

(51) Int. Cl.
  *H04W 88/08* (2009.01)
  *H04W 88/04* (2009.01)

(56) References Cited

U.S. PATENT DOCUMENTS

2014/0036762 A1* 2/2014 Al-Shalash ............ H04W 76/15
   370/315
2018/0279188 A1* 9/2018 Tenny ............... H04W 36/0009

OTHER PUBLICATIONS

3GPP, "3rd Generation Partnership Project; Technical Specification Group Radio Access Network; NG-RAN; Architecture description (Release 15)", 3GPP TS 38.401 V15.0.0, Dec. 2017, pp, 1-23.

3GPP, "3rd Generation Partnership Project; Technical Specification Group Radio Access Network; NG-RAN; F1 application protocol (F1AP); (Release 15)", 3GPP TS 38.473 V15.0.0, Dec. 2017, pp. 1-90.

3GPP, "3rd Generation Partnership Project; Technical Specification Group Radio Access Network; Study on new radio access technology: Radio access architecture and interfaces (Release 14)", 3GPP TR 38.801 V14.0.0, Mar. 2017, pp. 1-91.

3GPP, "3rd Generation Partnership Project; Technical Specification Group Services and System Aspects; 3GPP System Architecture Evolution (SAE); Security architecture (Release 15)", 3GPP TS 33.401 V15.3.0, Mar. 2018, pp. 1-163.

3GPP, "3rd Generation Partnership Project; Technical Specification Group Services and System Aspects; System Architecture for the 5G System; Stage 2 (Release 15)", 3GPP TS 23.501 V15.1.0, Mar. 2018, pp. 1-201.

Unknown, Author, "Way Forward—IAB Architecture for L2/3 relaying", 3GPP TSG-RAN WG3 Meeting #99 R3-181502, Athens, Greece, Jan. 26-Mar. 2, 2018, pp. 1-6.

Unknown, Author, "3rd Generation Partnership Project; Technical Specification Group Radio Access Network; NR; NR and NG-RAN Overall Description; Stage 2 (Release 15) The present", 3GPP TS 38.300 V0.6.0, Aug. 2017, pp. 1-58.

Unknown, Author, "User plane architecture", 3GPP TSG-RAN WG2 #96, R2-168214, Reno, Nevada, USA, Nov. 14-18, 2016, pp. 1-6.

* cited by examiner

ADAPTATION LAYER SETUP AND CONFIGURATION IN INTEGRATED ACCESS BACKHAULED NETWORKS

TECHNICAL FIELD

The present disclosure is generally related to wireless communication networks and is more particularly related to a relay node for configuring an adaptation layer that provides for routing of incoming packets to one or more further relay nodes or to one or more user equipments, UEs, connected to the relay node and for mapping of those incoming packets to bearers.

BACKGROUND

FIG. 1 illustrates a high-level view of the 5G network architecture for the 5G wireless communications system currently under development by the 3$^{rd}$-Generation Partnership Project (3GPP) and consisting of a Next Generation Radio Access Network (NG-RAN) and a 5G Core (5GC). The NG-RAN comprises a set of gNodeB's (gNBs) connected to the 5GC via one or more NG interfaces, whereas the gNBs can be connected to each other via one or more Xn interfaces. Each of the gNBs can support frequency division duplexing (FDD), time division duplexing (TDD), or a combination thereof. The radio technology for the NG-RAN is often referred to as "New Radio" (NR).

The NG RAN logical nodes shown in FIG. 1 (and described in 3GPP TS 38.401 and 3GPP TR 38.801) include a central unit (CU or gNB-CU) and one or more distributed Units (DU or gNB-DU). The CU is a logical node that is a centralized unit hosting high layer protocols, and includes a number of gNB functions, including controlling the operation of DUs. A DU is a decentralized logical node that hosts lower layer protocols and can include, depending on the functional split option, various subsets of the gNB functions. (As used herein, the terms "central unit" and "centralized unit" are used interchangeably, and the terms "distributed unit" and "decentralized unit" are used interchangeably.) The gNB-CU connects to gNB-DUs over respective F1 logical interfaces. The gNB-CU and connected gNB-DUs are only visible to other gNBs and to the 5GC as a gNB, e.g., the F1 interface is not visible beyond gNB-CU.

Furthermore, the F1 interface between the gNB-CU and gNB-DU is specified, or based on, the following general principles:
F1 is an open interface;
F1 supports the exchange of signaling information between respective endpoints, as well as data transmission to the respective endpoints;
from a logical standpoint, F1 is a point-to-point interface between the endpoints (even in the absence of a physical direct connection between the endpoints);
F1 supports control plane (CP) and user plane (UP) separation, such that a gNB-CU may be separated in CP and UP;
F1 separates Radio Network Layer (RNL) and Transport Network Layer (TNL);
F1 enables exchange of user-equipment (UE) associated information and non-UE associated information;
F1 is defined to be future proof with respect to new requirements, services, and functions;
A gNB terminates X2, Xn, NG and S1-U interfaces and, for the F1 interface between DU and CU, utilizes the F1 application part protocol (F1-AP) which is defined in 3GPP TS 38.473 and which is incorporated by reference herein in its entirety.

Furthermore, in a CU can host protocols such as Radio Resource Control (RRC) and Packet Data Convergence Protocol (PDCP), while a DU can host protocols such as Radio Link Control (RLC), Medium Access Control (MAC) and the physical layer protocol (PHY). Other variants of protocol distributions between CU and DU can exist, however, such as hosting the RRC, PDCP and part of the RLC protocol in the CU (e.g., the automatic retransmission request (ARQ) function), while hosting the remaining parts of the RLC protocol in the DU, together with MAC and PHY. In some exemplary embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

It has also been agreed in 3GPP RAN3 Working Group (WG) to support a separation of the gNB-CU into a CU-CP function (including RRC and PDCP for signaling radio bearers) and CU-UP function (including PDCP for user plane). The CU-CP and CU-UP parts communicate with each other using the E1-AP protocol over the E1 interface. The CU-CP/UP separation is illustrated in FIG. 2.

In the architecture identified by CUs and DUs, dual-connectivity (DC) can be achieved by allowing a UE to connect to multiple DUs served by the same CU or by allowing a UE to connect to multiple DUs served by different CUs. As illustrated in FIG. 1, a gNB can include a gNB-CU connected to one or more gNB-DUs via respective F1 interfaces, all of which are described hereinafter in greater detail. In the NG-RAN architecture, however, a gNB-DU can be connected to only a single gNB-CU.

The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In NG-Flex configuration, each gNB is connected to all 5GC nodes within a pool area. The pool area is defined in 3GPP TS 23.501. If security protection for control plane and user plane data on TNL of NG-RAN interfaces has to be supported, network domain security/IP-layer security (NDS/IP) shall be applied (3GPP TS 33.401).

In the context of RAN 5G architectures, 3GPP has agreed that dual connectivity is supported. Such mechanism consists of establishing master and secondary nodes and it consists of distributing user plane (UP) traffic to the master node (MN) and secondary nodes (SNs) according to the best possible traffic and radio resource management. CP traffic is assumed to terminate in one node only, i.e. the MN. FIGS. 3 and 4 show the protocol and interfaces involved in dual connectivity, as per 3GPP TS 38.300 v0.6.0, which can be found at ftp.3gpp.org/Specs/archive/38_series/38.300/38300-060.zip.

FIG. 3 illustrates bearers for dual connectivity in the Master gNB (MgNB) and shows that the MgNB is able to forward PDCP bearer traffic to a Secondary gNB (SgNB). Likewise, FIG. 4 illustrates bearers for dual connectivity in the SgNB and shows that the SGNB forwards PDCP bearer traffic to the MgNB. It should be understood that the MgNB and SgNB may be subject to the RAN split architecture outlined above, and thus comprise CUs and DUs. Note that the figures illustrate master cell group (MCG) bearers and secondary cell group (SCG) bearers—an MCG bearer is a radio bearer that uses only the radio leg of the MgNB, while a SCG bearer is a radio bearer that uses only the radio leg of the SgNB. An MN-terminated split bearer is controlled by the MgNB but uses the radio legs of both the MgNB and SgNB, while an SN split bearer is controlled by the SgNB but uses the radio leg of both the SgNB and MgNB.

Furthermore, in the context of 5G standardization, multi-RAT dual connectivity (MR-DC) is being specified. When MR-DC is applied, a RAN node (the master node, MN) anchors the control plane towards the CN, while another RAN node (the secondary node, SN) provides control and user plane resources to the UE via coordination with the MN. This is shown in FIG. 5, which is extracted from 3GPP TS 37.340.

Within the scope of MR-DC, various user plane/bearer type solutions are possible, as seen in FIG. 6 (also taken from 3GPP TS 37.340), which shows the radio protocol architecture for MGC bearer, MGC split bearer, SCG bearer, and SCG split bearer, in MR-DC with 5G.

In 3GPP TS 38.401, overall procedures are depicted, including signaling flows in the gNB-CU/gNB-DU architecture for such processes as initial access from the UE, inter-DU mobility, etc.

One specific variety of MR-DC is called EN-DC (Evolved Universal Terrestrial Radio Access/New Radio Dual Connectivity). In this case, the LTE eNB is the Master Node (MN) and the NR gNB is the secondary node (SN).

For Release 15 of the 3GPP standards (referred to hereinafter as "3GPP Rel-15"), it has been agreed to support Non-standalone NR deployments. In this case, the NR RAT does not support stand-alone operation, i.e., it cannot serve UEs by itself. Instead, dual connectivity (EN-DC flavor) is used to serve end users. This means that a UE first connects to an LTE MeNB, which later sets up the NR leg in the SgNB (secondary gNB). FIG. 7 illustrates an example signaling flow for this procedure.

In the procedure shown in FIG. 7, the UE first performs connection in LTE (steps 1-11). At this point, the network has instructed the UE to measure on NR RAT. Note that the measurement configuration can come at any point after (or along with) message 11. Then, the UE sends a measurement report regarding NR RAT. The network can then initiate the setup of the NR leg (steps 16-26). For EN-DC the Evolved Packet Core (EPC) core network is used, rather than a 5G Core (5GC).

In addition to non-standalone operation, NR will also support standalone (SA) operation. In this case, the UEs that support SA NR will camp on NR cells and perform access directly to the NR system (i.e., no connection to LTE first is required to access the NR). A SA-capable NR gNB will broadcast System Information (SI) in the cell that is used to access the NR cell, in a way similar to LTE operation, though the contents of the SI, as well as the manner in which it is broadcasted (e.g., periodicity) could be different from LTE.

Densification via the deployment of more and more base stations (e.g., macro or micro base stations) is one of the mechanisms that can be employed to satisfy the increasing demand for bandwidth and/or capacity in mobile networks, which is mainly driven by the increasing use of video streaming services. Due to the availability of more spectrum in the millimeter wave (mmw) band, deploying small cells that operate in this band is an attractive deployment option for these purposes. However, the normal approach of connecting the small cells to an operator's backhaul network with optical fiber can end up being very expensive and impractical. Employing wireless links for connecting the small cells to the operator's network is a cheaper and more practical alternative. One such approach is an integrated access backhaul (IAB) network, where the operator can utilize part of the available radio resources for the backhaul link.

IAB has been studied earlier in 3GPP in the scope of Long Term Evolution (LTE) Rel-10. In that work, an architecture was adopted where a Relay Node (RN) has the functionality of both an LTE eNB and UE modem. The RN is connected to a donor eNB, which has a S1/X2 proxy functionality hiding the RN from the rest of the network. That architecture enabled the Donor eNB to also be aware of the UEs behind the RN and hide any UE mobility between Donor eNB and Relay Node on the same Donor eNB from the CN. During the Rel-10 study, other architectures were also considered including, e.g., where the RNs are more transparent to the Donor gNB and allocated a separate stand-alone P/S-GW node.

For 5G/NR, similar options utilizing IAB can also be considered. One difference compared to LTE is the gNB-CU/DU split described above, which separates time-critical RLC/MAC/PHY protocols from less time-critical RRC/PDCP protocols. It is anticipated that a similar split could also be applied for the IAB case. Other IAB-related differences anticipated in NR as compared to LTE are support for multiple hops and support for redundant paths.

During the RAN3 #99 meeting in Athens (February 2018), several IAB multi-hop designs were proposed, and summarized under five architecture reference diagrams (available at 35w.3gpp.org/ftp/tsg_ran/wg3_iu/TSGR3_99/Docs/R3-181502.zip). These reference diagrams differ with respect to the modification needed on interfaces or additional functionality needed, e.g., to accomplish multi-hop forwarding. These five architectures are divided into two architecture groups. The main features of these architectures can be summarized as follows:

Architecture group 1: Consists of architectures 1a and 1b. Both architectures leverage CU/DU split architecture.
    Architecture 1a:
        Backhauling of F1-U uses an adaptation layer or GTP-U combined with an adaptation layer.
        Hop-by-hop forwarding across intermediate nodes uses the adaptation layer.
    Architecture 1b:
        Backhauling of F1-U on access node uses GTP-U/UDP/IP.
        Hop-by-hop forwarding across intermediate node uses the adaptation layer.
Architecture group 2: Consists of architectures 2a, 2b and 2c
    Architecture 2a:
        Backhauling of F1-U or NG-U on access node uses GTP-U/UDP/IP.
        Hop-by-hop forwarding across intermediate node uses packet data unit (PDU)-session-layer routing.
    Architecture 2b:
        Backhauling of F1-U or NG-U on access node uses GTP-U/UDP/IP.
        Hop-by-hop forwarding across intermediate node uses GTP-U/UDP/IP nested tunnelling.

Architecture 2c:
  Backhauling of F1-U or NG-U on access node uses GTP-U/UDP/IP.
  Hop-by-hop forwarding across intermediate node uses GTP-U/UDP/IP/PDCP nested tunnelling.

Architecture 1a leverages CU/DU-split architecture. FIG. 8 shows the reference diagram for a two-hop chain of IAB-nodes underneath an IAB-donor. In this architecture, each IAB node holds a DU and an Mobile Termination (MT), the latter of which is a function residing on the IAB-node that terminates the radio interface layers of the backhaul Uu interface toward the IAB-donor or other IAB-nodes. Effectively, the MT stands in for a UE on the Uu interface to the upstream relay node. Via the MT, the IAB-node connects to an upstream IAB-node or the IAB-donor. Via the DU, the IAB-node establishes RLC-channels to UEs and to MTs of downstream IAB-nodes. For MTs, this RLC-channel may refer to a modified RLC*.

The donor also holds a DU to support UEs and MTs of downstream IAB-nodes. The IAB-donor holds a CU for the DUs of all IAB-nodes and for its own DU. Each DU on an IAB-node connects to the CU in the IAB-donor using a modified form of F1, which is referred to as F1*. F1*-U runs over RLC channels on the wireless backhaul between the MT on the serving IAB-node and the DU on the donor. F1*-U provides transport between MT and DU on the serving IAB-node as well as between DU and CU on the donor. An adaptation layer is added, which holds routing information, enabling hop-by-hop forwarding. It replaces the IP functionality of the standard F1-stack. F1*-U may carry a GTP-U header for the end-to-end association between CU and DU. In a further enhancement, information carried inside the GTP-U header may be included in the adaption layer. Further, optimizations to RLC may be considered such as applying ARQ only on the end-to-end connection opposed to hop-by-hop. The right side of FIG. 8 shows two examples of such F1*-U protocol stacks. In this figure, enhancements of RLC are referred to as RLC*. The MT of each IAB-node further sustains NAS connectivity to the NGC, e.g., for authentication of the IAB-node. It further sustains a PDU-session via the NGC, e.g., to provide the IAB-node with connectivity to the OAM.

Architecture 1b also leverages CU/DU-split architecture. FIG. 9 shows the reference diagram for this architecture, for a two-hop chain of IAB-nodes underneath an IAB-donor. Note that the IAB-donor only holds one logical CU.

In this architecture, each IAB-node and the IAB-donor hold the same functions as in architecture 1a. Also, as in architecture 1a, every backhaul link establishes an RLC-channel, and an adaptation layer is inserted to enable hop-by-hop forwarding of F1*.

In contrast to the approach taken in architecture 1a, however, the MT on each IAB-node establishes a PDU-session with a UPF residing on the donor. The MT's PDU-session carries F1* for the collocated DU. In this manner, the PDU-session provides a point-to-point link between CU and DU. On intermediate hops, the PDCP-PDUs of F1* are forwarded via adaptation layer in the same manner as described for architecture 1a. The right side of FIG. 9 shows an example of the F1*-U protocol stack.

In architecture 2a, the IAB-node holds an MT to establish an NR Uu link with a gNB on the parent IAB-node or IAB-donor. Via this NR-Uu link, the MT sustains a PDU-session with a UPF that is collocated with the gNB. In this manner, an independent PDU-session is created on every backhaul link. Each IAB-node further supports a routing function to forward data between PDU-sessions of adjacent links. This creates a forwarding plane across the wireless backhaul. Based on PDU-session type, this forwarding plane supports IP or Ethernet. In case PDU-session type is Ethernet, an IP layer can be established on top. In this manner, each IAB-node obtains IP-connectivity to the wireline backhaul network.

All IP-based interfaces such as NG, Xn, F1, N4, etc. are carried over this forwarding plane. In the case of F1, the UE-serving IAB-Node would contain a DU rather than a full gNB, and the CU would be in or beyond the IAB Donor. The right side of FIG. 10 shows an example of the NG-U protocol stack for IP-based and for Ethernet-based PDU-session type.

In case the IAB-node holds a DU for UE-access, it may not be required to support PDCP-based protection on each hop since the end user data will already be protected using end to end PDCP between the UE and the CU.

In architecture 2b, the IAB-node holds an MT to establish an NR Uu link with a gNB on the parent IAB-node or IAB-donor. Via this NR-Uu link, the MT sustains a PDU-session with a UPF. As opposed to the approach taken in architecture 2a, this UPF is located at the IAB-donor. Also, forwarding of PDUs across upstream IAB-nodes is accomplished via tunnelling. The forwarding across multiple hops, therefore, creates a stack of nested tunnels. As in architecture 2a, each IAB-node obtains IP-connectivity to the wireline backhaul network. All IP-based interfaces such as NG, Xn, F1, N4, etc. are carried over this forwarding IP plane. The right side of FIG. 11 shows a protocol stack example for NG-U.

Architecture 2c leverages DU-CU split. The IAB-node holds an MT which sustains an RLC-channel with a DU on the parent IAB-node or IAB-donor. The IAB donor holds a CU and a UPF for each IAB-node's DU. The MT on each IAB-node sustains an NR-Uu link with a CU and a PDU session with a UPF on the donor. Forwarding on intermediate nodes is accomplished via tunneling. The forwarding across multiple hops creates a stack of nested tunnels. As in architecture 2a and 2b, each IAB-node obtains IP-connectivity to the wireline backhaul network. Differently from architecture 2b, however, each tunnel includes an SDAP/PDCP layer. All IP-based interfaces such as NG, Xn, F1, N4, etc. are carried over this forwarding plane. The right side of FIG. 12 shows a protocol stack example for NG-U.

From the 3GPP RAN2 agreement, both SA and NSA (EN-DC) on access link (between UE and IAB node) shall be supported. An example deployment for IAB using EN-DC could be a macro grid LTE network which is densified by adding new micro nodes which some are backhauled using IAB. In this example scenario, the macro sites are upgraded to also support NR (in addition to LTE) and the micro sites only support NR, as shown in FIG. 13.

In this case, it should be possible to operate in EN-DC utilizing LTE wide area coverage and NR as a data boost. The EN-DC solution allows separation of the LTE and NR using non-ideal transport, meaning it should be feasible for the EN-DC solution to support the IAB scenario where the NR node serving the UE is wirelessly backhauled using another NR node. FIG. 14 shows an example logical architecture for this scenario where the NR node being wirelessly backhauled over NR labelled NR IAB Node performs the functions of an en-gNB-DU serving the NR SCG link.

The existing EN-DC solution including X2 interface functions should be applicable for IAB nodes supported EN-DC UEs. No IAB specific impact is foreseen on the LTE eNB for support EN-DC on the access link.

It is assumed that integrated access and backhaul should be supported also in stand-alone NR deployment. For this reason, we assume that the standard should support IAB also when using stand-alone NR both on the access and backhaul link to allow full NR only deployments, as shown in FIG. 15.

The standard should support IAB when using stand-alone NR both on the access and backhaul link.

Given that the IAB backhaul link is a network internal link there is more flexibility how this link can be realized, compared to the access link, which needs to inter-work with millions of devices/UEs (including legacy devices). For this reason, it can be discussed whether both EN-DC and SA NR should also be supported on the backhaul link. The scenario for using EN-DC for backhaul and its high-level logical architecture is illustrated in FIG. 16.

One argument for supporting EN-DC is that if the rest of the network (including the packet core) does not support stand-alone NR, it would not be feasible to connect the IAB node using stand-alone NR.

SUMMARY

As discussed above, there are several proposed architectures for IAB. However, the details of the protocol stacks, especially on how the adaptation layer is setup and reconfigured on the different IAB nodes as well as the donor DU/gNB are still open. The techniques and apparatus disclosed herein address several of these open aspects.

More particularly, detailed herein are mechanisms for the setup and reconfiguration of the adaptation layer that is needed in the IAB nodes and the Donor DU/gNB, for the proper routing of the incoming packets to the proper path (i.e., a next IAB node or the destination UE), as well as the mapping to the proper bearer in that path. This is realized by enhancing the F1-AP and RRC protocols. The techniques described herein take advantage of existing RRC and F1-AP protocols, or even existing procedures, to realize the setup and reconfiguration of adaptation layers that are needed for routing packets to the right path (i.e., next node) and mapping them to the right bearer within the correct path.

According to some embodiments, a method, in a relay node, for configuring an adaptation layer, wherein the relay node communicates with a central unit of a donor base station through a distributed unit of the donor base station, includes the relay node connecting to the donor base station. The donor base station includes the central unit and one or more distributed units, with an F1 interface defined between the central unit and each of the distributed units. The method includes, after establishing the connection, configuring an adaptation layer in a protocol stack for an MT part of the relay node, the adaptation layer providing for routing of incoming packets to one or more further relay nodes or to one or more UEs connected to the relay node and for mapping of those incoming packets to bearers. The method further includes, after configuring the adaptation layer for the MT part of the relay node, configuring an adaptation layer for a distributed unit part of the relay node for forwarding packets exchanged between the central unit of the donor base station and a first further relay node downstream of the relay node.

According to some embodiments, a method for configuring an adaptation layer in a relay node that communicates with a central unit of a donor base station through a distributed unit of the donor base station is carried out in the central unit, where the donor base station comprises the central unit and one or more distributed units for radio communication with attached nodes, with an F1 interface defined between the central unit and each of the distributed units. The method includes using RRC signaling to establish connection with an MT part of the relay node and, after establishing the connection, signaling with the MT part of the relay node to configure an adaptation layer in a protocol stack for the MT part of the relay node, the adaptation layer providing for routing of incoming packets to one or more further relay nodes or to one or more UEs connected to the relay node and for mapping of those incoming packets to bearers. The method further includes configuring an adaptation layer at the distributed unit of the donor base station, the adaptation layer at the distributed unit of the donor base station being configured to route incoming packets to a proper relay node of one or more relay nodes downstream of the donor base station.

Further aspects of the present invention are directed to a central unit, an IAB/relay node, and computer program products or computer readable storage medium corresponding to the methods summarized above.

Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
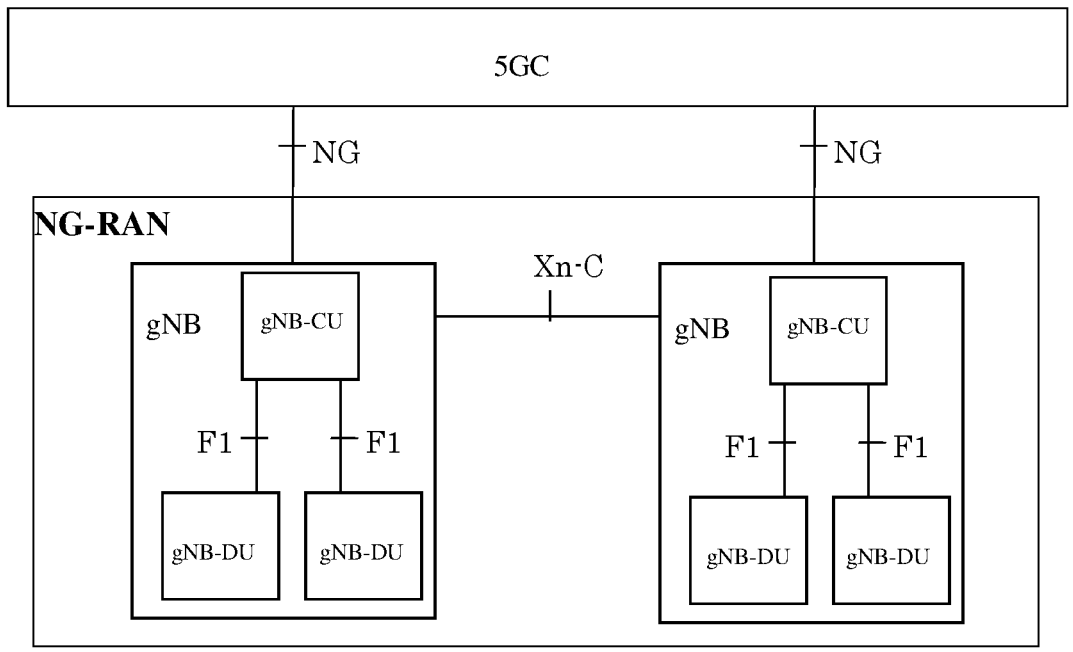
FIG. 1 illustrates the logical network architecture for 5G.

Exemplary embodiments briefly summarized above will now be described more fully with reference to the accompanying drawings. These descriptions are provided by way of example to explain the subject matter to those skilled in the art and should not be construed as limiting the scope of the subject matter to only the embodiments described herein. More specifically, examples are provided below that illustrate the operation of various embodiments according to the advantages discussed above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Again, detailed herein are mechanisms for the setup and reconfiguration of the adaptation layer that is needed in the IAB nodes and the Donor DU/gNB, for the proper routing of the incoming packets to the proper path (i.e., a next IAB node or the destination UE), as well as the mapping to the proper bearer in that path. This is realized by enhancing the F1-AP and RRC protocols. The techniques described herein take advantage of existing RRC and F1-AP protocols, or even existing procedures, to realize the setup and reconfiguration of adaptation layers that are needed for routing packets to the right path (i.e., next node) and mapping them to the right bearer within the correct path.

The following description focuses on the case where the IAB nodes are connected towards the network (to the next IAB node on the chain or the Donor DU/gNB in the case of the last IAB node in the chain) using NR air interface. Accordingly, the NR RRC protocol is assumed. However, the techniques described herein are equally applicable to the case where these links are using the LTE air interface (e.g., in an EN-DC setting as discussed above). In this case, RRC refers to the LTE RRC protocol.

Furthermore, the present description focuses on architectures 1a and 1b, as described above. However, the techniques are equally applicable to, for example, the architecture 2 variants, if they are updated to leverage the CU/DU split architecture as in architectures 1a and 1b.

Finally, this description focuses on the setup/reconfiguration aspects of the adaptation layers, and thus discusses and illustrates control plane architecture diagrams and F1-AP/RRC aspects. However, the actual working of the adaptation layer (i.e., routing and mapping) is applicable to both user plane (UP) UP and control plane (CP) packets. For the UP packets, some of the mapping of the adaptation layer will be based on the GTP-U information (e.g., GTP Tunnel ID, port number, etc.).

In this description, it has been assumed that the same CU is controlling the DU parts of all the involved IAB nodes. However, it could be that different CUs may be controlling the IAB nodes instead. In that case, communication between the CUs will be required during the adaptation layer setup/reconfigurations.

Figure 17:
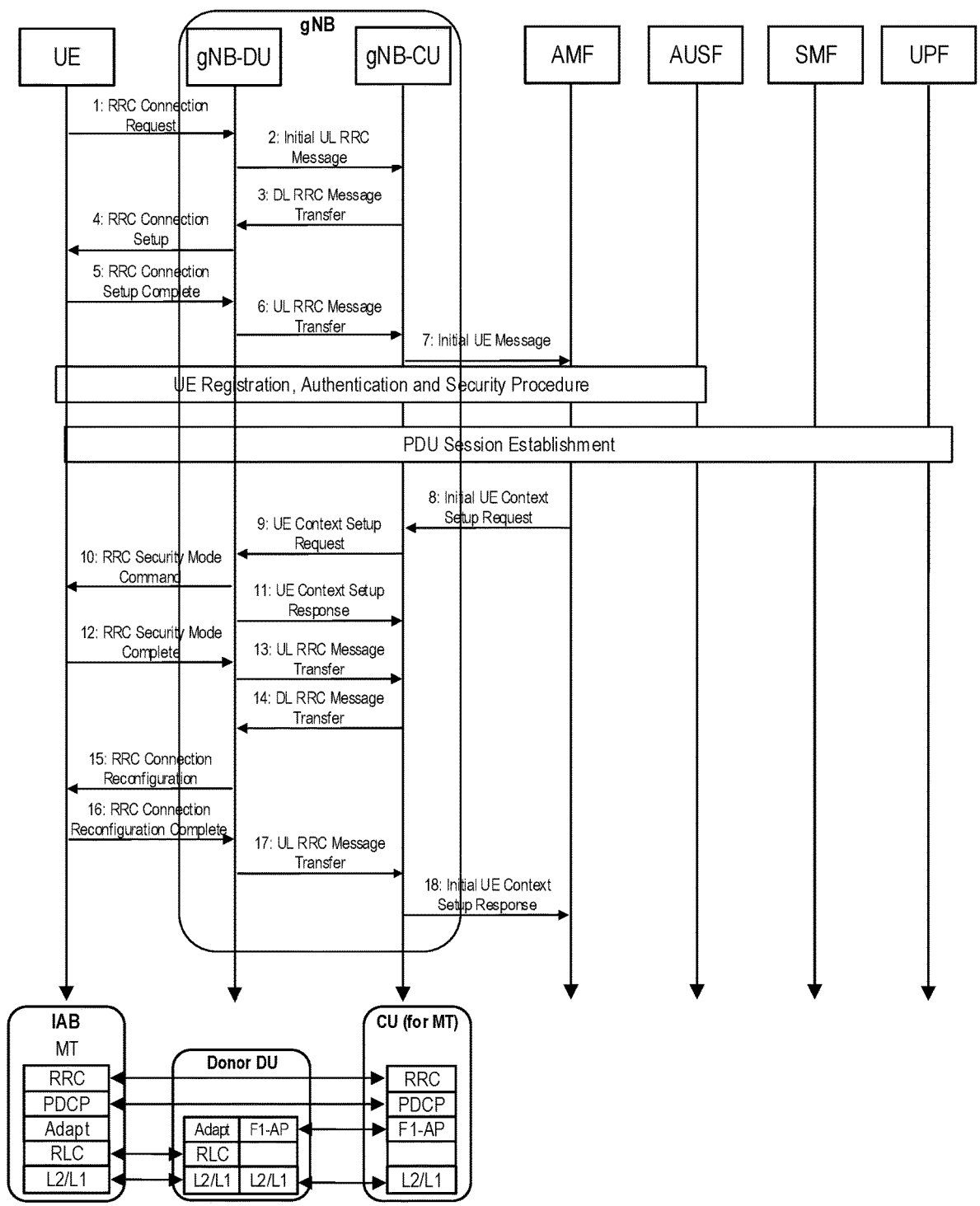
FIG. 17 is a signal flow diagram illustrating an example IAB node connectivity procedure.

In the first phase of IAB node setup/operation, the IAB node establishes IP connectivity to the operator's network. This enables the IAB node to reach OAM functionality for initial OAM configuration, as well as setting up connectivity to the CU which is performed in the second phase of the setup procedure. For this purpose, one possible option is to study the legacy UE attach procedure and tailor it to meet the requirements of an IAB node, as shown in FIG. 17.

The adaptation layer needs to be configured in this first phase of the setup procedure of the IAB node. The adaptation layer can be set up after the relay node connects to the donor base station, e.g., after the PDU session (on NAS level) is established. More specifically, the "UE Context Setup" procedure could be modified to configure the adaptation layer for the DU part of the Donor node as well as mapping to the right radio bearer on the backhaul link. Whereas, the adaptation layer of the MT stack could be part of the DRB setup.

It can be observed that the UE context setup and data radio bearer setup procedures can be modified for the configuration of the adaptation layer of Donor node and MT part of IAB node. Thus, the adaptation layer should be configured in the first phase of the setup procedure for IAB node after the PDU session (for the MT part of the IAB node) is established. Further, the adaptation layer of the MT stack should be configured as part of DRB setup over the backhaul link.

After completing the configuration for the adaptation layer of the MT stack, the next step is to setup/configure the DU part of the IAB node. For this purpose, a mechanism is needed to trigger the setup/configuration of the DU function once the adaptation layer for the MT part is setup. The adaptation layer of the MT part of the IAB node is thus configured before setting up the DU function of the IAB node.

Later, another IAB node could get connected as an MT to the network via the first IAB node (i.e., multi-hop setup). Then during the setup process for the MT part of this second level IAB node, the adaptation layer of the DU part of the first IAB node should also be configured. Thus, it can further be observed that the adaptation layer of the DU part of an IAB node needs to be configured when another IAB node connects to it as an MT (i.e., multi-hop setup).

The RRC connection procedure can be used to setup the adaptation layer for the MT stack, whereas the F1-AP can be employed to configure the adaptation layer for the DU part of an IAB node as well as the Donor DU. The adaptation layer for the MT must be in place before setting up the F1 signaling.

Thus, in some embodiments of the presently disclosed techniques, the RRC protocol is used to setup the adaptation layer for the MT part of the IAB nodes. The F1-AP may be employed to setup the adaptation layer for the DU part of the IAB nodes as well as for the Donor DU. Note that the adaptation layer for the MT part of an IAB node should be in place before setting up the F1 signaling for the DU part of the IAB node.

The content of the signaling messages shown in FIG. 17 should thus be modified/enhanced to include the setup of the adaptation layer for both parts of IAB node.

Figure 18:
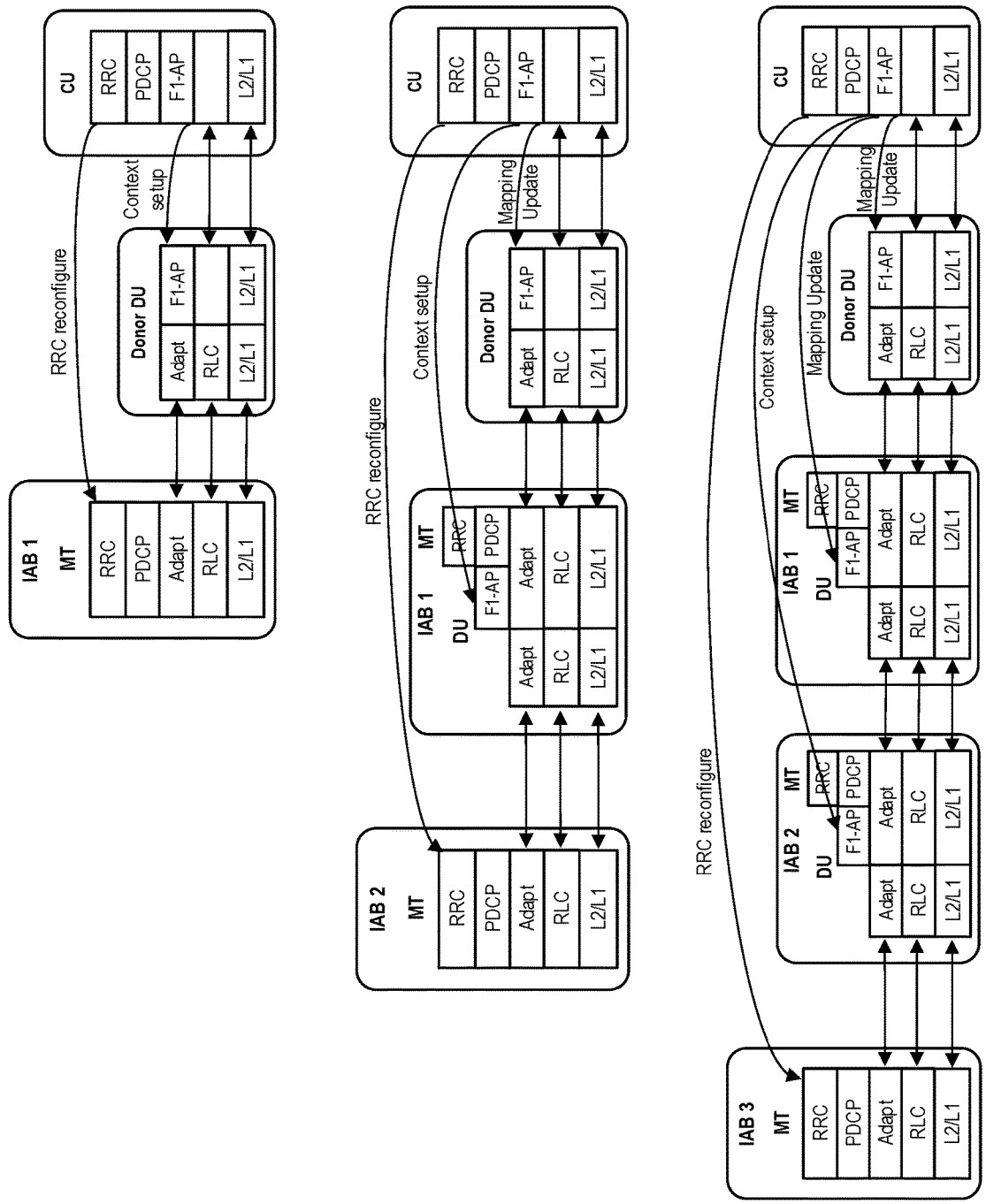
FIG. 18 illustrates the configuring of IAB nodes added in cascade.

For architecture 1a and 1b, every time a new IAB node is attached to the network, the adaptation layers for the already connected IAB DUs (as well as the Donor DU) need to be updated/modified. This is illustrated in FIG. 18, where F1-AP is used to do the required reconfigurations. Accordingly, in some embodiments of the presently disclosed techniques, the adaptation layer of IAB nodes are reconfigured/updated with F1-AP.

Figure 19:
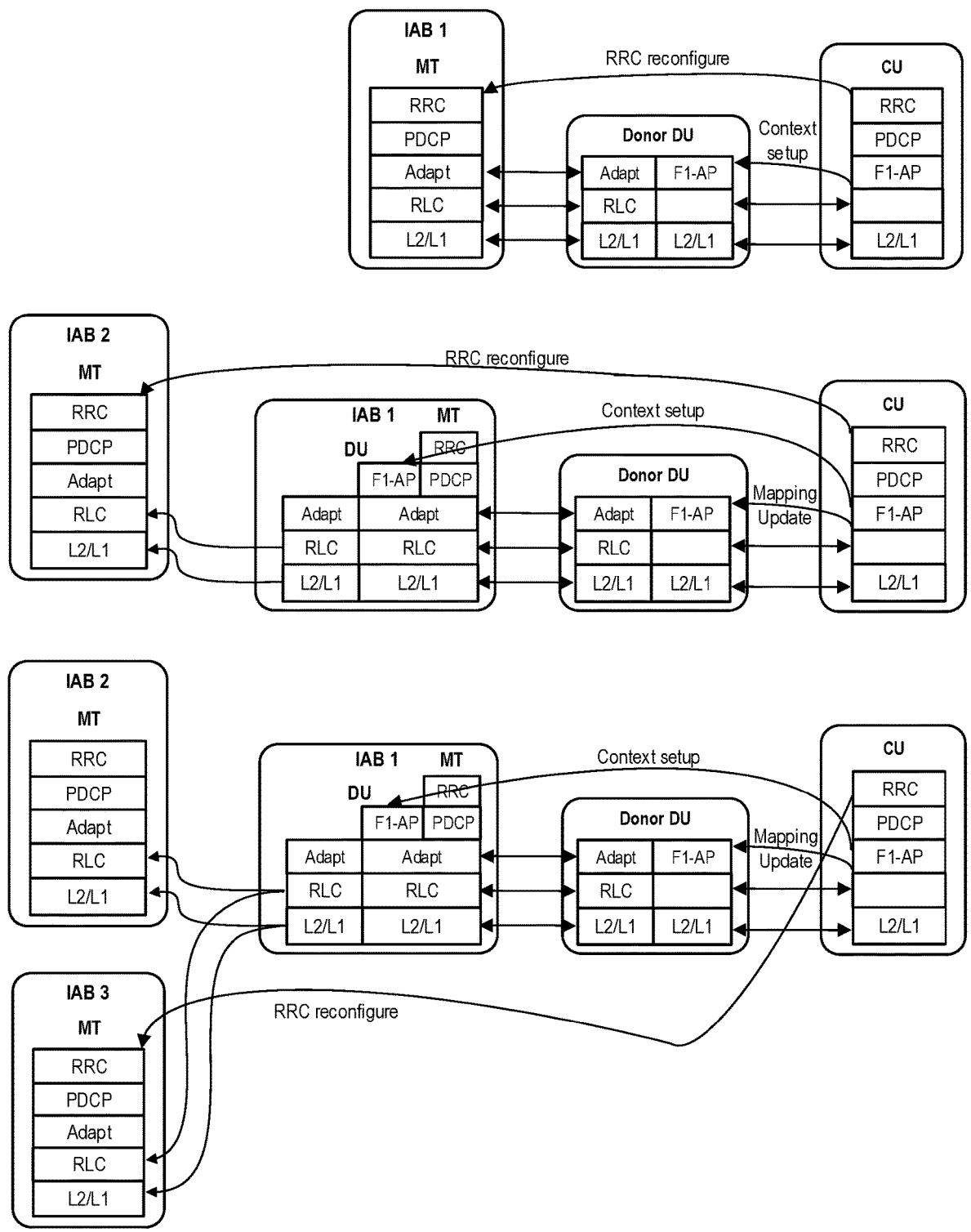
FIG. 19 illustrates the configuring of IAB nodes attached in parallel.

FIG. 19 shows an example of the MT part of IAB nodes attached in parallel to the network (i.e., the adding of IAB nodes at the same hop level). In general, there is no significant difference between the parallel and cascade cases—in both cases, F1-AP is used for the reconfigurations—except now the RRC protocol for the MT part of every IAB node attached to the network traverses the same number of hops. Like the cascade case, here the adaptation layer of the intermediate IAB nodes (as well as the Donor DU) should also be updated/modified to enable them to route the packets intended for the other IAB nodes.

Figure 20:
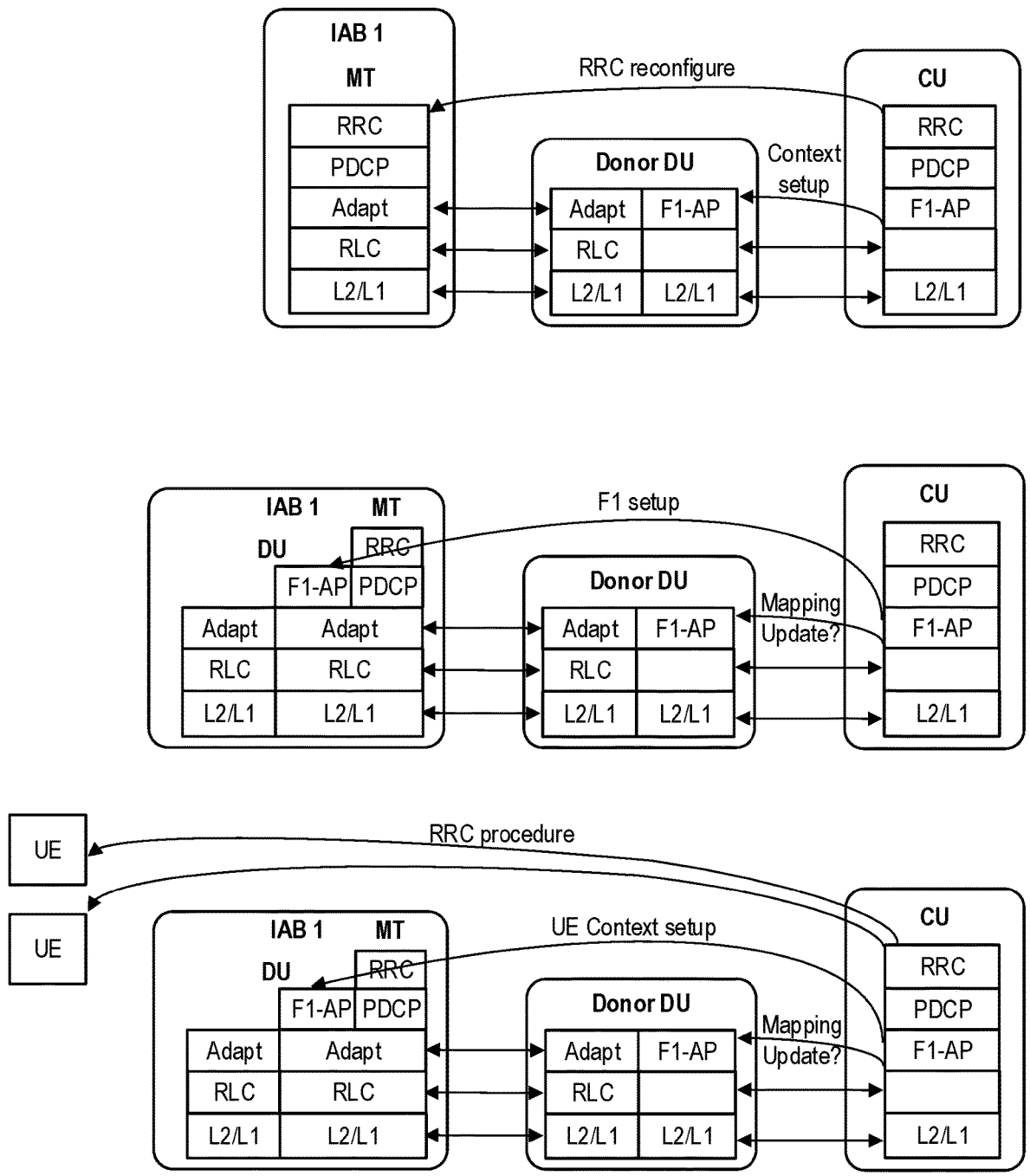
FIG. 20 illustrates the connection of UEs to an IAB node.

FIG. 20 shows an example for UEs attaching to IAB node. Unlike the above two cases/examples, in this case, the IAB1 node is the last node (i.e., no further hops). As in the above cases, the F1-AP is employed to reconfigure the adaptation layer of the IAB node. On the other hand, the adaptation layer for the DU part of the Donor node (as well as the intermediate node) may or may not be needed to be reconfigured depending on several factors such as whether different or same IP addresses are employed for the MT and DU parts of the IAB nodes, whether there is already a backhaul bearer setup that can be mapped to the UE's bearers; and/or whether a static mapping is used in all the backhaul nodes (e.g., a certain range of port numbers associated for a bearer of given QoS).

Figure 21:
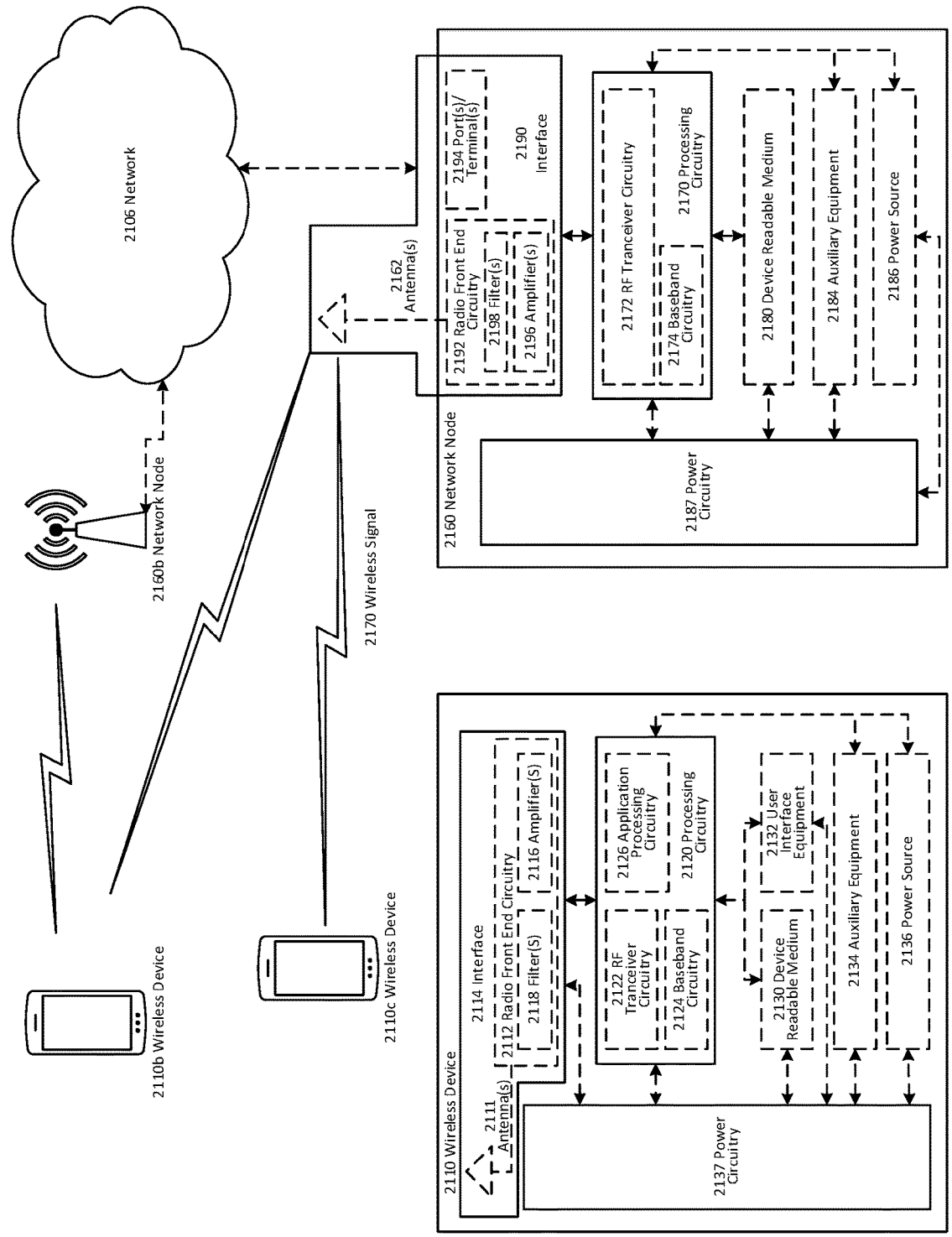
FIG. 21 shows a wireless network in accordance with some embodiments.

Although the subject matter described herein can be implemented in any appropriate type of system using any suitable components, the embodiments disclosed herein are described in relation to a wireless network like the example wireless network illustrated in FIG. 21. For simplicity, the wireless network of FIG. 21 only depicts network 2106, network nodes 2160 and 2160b, and WDs 2110, 2110b, and 2110c. In practice, a wireless network can further include any additional elements suitable to support communication between wireless devices or between a wireless device and another communication device, such as a landline telephone, a service provider, or any other network node or end device. Of the illustrated components, network node 2160 and wireless device (WD) 2110 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2106 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2160 and WD 2110 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power levels) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 21, network node 2160 includes processing circuitry 2170, device readable medium 2180, interface 2190, auxiliary equipment 2184, power source 2186, power circuitry 2187, and antenna 2162. Although network node 2160 illustrated in the example wireless network of FIG. 21 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 2160 are depicted as single boxes located within a larger box, or nested within multiple boxes, in practice, a network node can comprise multiple different physical components that make up a single illustrated component (e.g., device readable medium 2180 can comprise multiple separate hard drives as well as multiple RAM modules).

Similarly, network node 2160 can be composed of multiple physically separate components (e.g., a gNB CU and a gNB DU, an IAB MT part and an IAB distributed unit part, etc.), which can each have their own respective components. In certain scenarios in which network node 2160 comprises multiple separate components (e.g., BTS and BSC components), one or more of the separate components can be shared among several network nodes. In some embodiments, network node 2160 can be configured to support multiple radio access technologies (RATs). In such embodiments, some components can be duplicated (e.g., separate device readable medium 2180 for the different RATs) and some components can be reused (e.g., the same antenna 2162 can be shared by the RATs). Network node 2160 can also include multiple sets of the various illustrated components for different wireless technologies integrated into network node 2160, such as, for example, GSM, WCDMA, LTE, NR, WiFi, or Bluetooth wireless technologies. These wireless technologies can be integrated into the same or different chip or set of chips and other components within network node 2160.

Processing circuitry 2170 can be configured to perform any determining, calculating, or similar operations (e.g., certain obtaining operations) described herein as being provided by a network node. These operations performed by processing circuitry 2170 can include processing information obtained by processing circuitry 2170 by, for example, converting the obtained information into other information, comparing the obtained information or converted information to information stored in the network node, and/or performing one or more operations based on the obtained information or converted information, and as a result of said processing making a determination.

Processing circuitry 2170 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2160 components, such as device readable medium 2180, network node 2160 functionality. For example, processing circuitry 2170 can execute instructions stored in device readable medium 2180 or in memory within processing circuitry 2170. Such functionality can include providing any of the various wireless features, functions, or benefits discussed herein. In some embodiments, processing circuitry 2170 can include a system on a chip (SOC).

In some embodiments, processing circuitry 2170 can include one or more of radio frequency (RF) transceiver circuitry 2172 and baseband processing circuitry 2174. In some embodiments, radio frequency (RF) transceiver circuitry 2172 and baseband processing circuitry 2174 can be on separate chips (or sets of chips), boards, or units, such as radio units and digital units. In alternative embodiments, part or all of RF transceiver circuitry 2172 and baseband processing circuitry 2174 can be on the same chip or set of chips, boards, or units In certain embodiments, some or all of the functionality described herein as being provided by a network node, base station, eNB or other such network device can be performed by processing circuitry 2170 executing instructions stored on device readable medium 2180 or memory within processing circuitry 2170. In alternative embodiments, some or all of the functionality can be provided by processing circuitry 2170 without executing instructions stored on a separate or discrete device readable medium, such as in a hard-wired manner. In any of those embodiments, whether executing instructions stored on a device readable storage medium or not, processing circuitry 2170 can be configured to perform the described functionality. The benefits provided by such functionality are not limited to processing circuitry 2170 alone or to other components of network node 2160 but are enjoyed by network node 2160 as a whole, and/or by end users and the wireless network generally.

Device readable medium 2180 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 2170. Device readable medium 2180 can store any suitable instructions, data or information, including a computer program, software, an application including one or more of logic, rules, code, tables, etc. and/or other instructions capable of being executed by processing circuitry 2170 and, utilized by network node 2160. Device readable medium 2180 can be used to store any calculations made by processing circuitry 2170 and/or any data received via interface 2190. In some embodiments, processing circuitry 2170 and device readable medium 2180 can be considered to be integrated.

Interface 2190 is used in the wired or wireless communication of signalling and/or data between network node 2160, network 2106, and/or WDs 2110. As illustrated, interface 2190 comprises port(s)/terminal(s) 2194 to send and receive data, for example to and from network 2106 over a wired connection. Interface 2190 also includes radio front end circuitry 2192 that can be coupled to, or in certain embodiments a part of, antenna 2162. Radio front end circuitry 2192 comprises filters 2198 and amplifiers 2196. Radio front end circuitry 2192 can be connected to antenna 2162 and processing circuitry 2170. Radio front end circuitry can be configured to condition signals communicated between antenna 2162 and processing circuitry 2170. Radio front end circuitry 2192 can receive digital data that is to be sent out to other network nodes or WDs via a wireless connection. Radio front end circuitry 2192 can convert the digital data into a radio signal having the appropriate channel and bandwidth parameters using a combination of filters 2198 and/or amplifiers 2196. The radio signal can then be transmitted via antenna 2162. Similarly, when receiving data, antenna 2162 can collect radio signals which are then converted into digital data by radio front end circuitry 2192. The digital data can be passed to processing circuitry 2170. In other embodiments, the interface can comprise different components and/or different combinations of components.

In certain alternative embodiments, network node 2160 may not include separate radio front end circuitry 2192, instead, processing circuitry 2170 can comprise radio front end circuitry and can be connected to antenna 2162 without separate radio front end circuitry 2192. Similarly, in some embodiments, all or some of RF transceiver circuitry 2172 can be considered a part of interface 2190. In still other embodiments, interface 2190 can include one or more ports or terminals 2194, radio front end circuitry 2192, and RF transceiver circuitry 2172, as part of a radio unit (not shown), and interface 2190 can communicate with baseband processing circuitry 2174, which is part of a digital unit (not shown).

Antenna 2162 can include one or more antennas, or antenna arrays, configured to send and/or receive wireless signals. Antenna 2162 can be coupled to radio front end circuitry 2190 and can be any type of antenna capable of transmitting and receiving data and/or signals wirelessly. In some embodiments, antenna 2162 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 2162 can be separate from network node 2160 and can be connectable to network node 2160 through an interface or port.

Antenna 2162, interface 2190, and/or processing circuitry 2170 can be configured to perform any receiving operations and/or certain obtaining operations described herein as being performed by a network node. Any information, data and/or signals can be received from a wireless device, another network node and/or any other network equipment. Similarly, antenna 2162, interface 2190, and/or processing circuitry 2170 can be configured to perform any transmitting operations described herein as being performed by a network node. Any information, data and/or signals can be transmitted to a wireless device, another network node and/or any other network equipment.

Power circuitry 2187 can comprise, or be coupled to, power management circuitry and can be configured to supply the components of network node 2160 with power for performing the functionality described herein. Power circuitry 2187 can receive power from power source 2186. Power source 2186 and/or power circuitry 2187 can be configured to provide power to the various components of network node 2160 in a form suitable for the respective components (e.g., at a voltage and current level needed for each respective component). Power source 2186 can either be included in, or external to, power circuitry 2187 and/or network node 2160. For example, network node 2160 can be connectable to an external power source (e.g., an electricity outlet) via an input circuitry or interface such as an electrical cable, whereby the external power source supplies power to power circuitry 2187. As a further example, power source 2186 can comprise a source of power in the form of a battery or battery pack which is connected to, or integrated in, power circuitry 2187. The battery can provide backup power should the external power source fail. Other types of power sources, such as photovoltaic devices, can also be used.

Alternative embodiments of network node 2160 can include additional components beyond those shown in FIG. 21 that can be responsible for providing certain aspects of the network node's functionality, including any of the functionality described herein and/or any functionality necessary to support the subject matter described herein. For example, network node 2160 can include user interface equipment to allow and/or facilitate input of information into network node 2160 and to allow and/or facilitate output of information from network node 2160. This can allow and/or facilitate a user to perform diagnostic, maintenance, repair, and other administrative functions for network node 2160.

As used herein, wireless device (WD) refers to a device capable, configured, arranged and/or operable to communicate wirelessly with network nodes and/or other wireless devices. Unless otherwise noted, the term WD can be used interchangeably herein with user equipment (UE). Communicating wirelessly can involve transmitting and/or receiving wireless signals using electromagnetic waves, radio waves, infrared waves, and/or other types of signals suitable for conveying information through air. In some embodiments, a WD can be configured to transmit and/or receive information without direct human interaction. For instance, a WD can be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 2110 includes antenna 2111, interface 2114, processing circuitry 2120, device readable medium 2130, user interface equipment 2132, auxiliary equipment 2134, power source 2136 and power circuitry 2137. WD 2110 can include multiple sets of one or more of the illustrated components for different wireless technologies supported by WD 2110, such as, for example, GSM, WCDMA, LTE, NR, WiFi, WiMAX, or Bluetooth wireless technologies, just to mention a few. These wireless technologies can be integrated into the same or different chips or set of chips as other components within WD 2110.

Antenna 2111 can include one or more antennas or antenna arrays, configured to send and/or receive wireless signals, and is connected to interface 2114. In certain alternative embodiments, antenna 2111 can be separate from WD 2110 and be connectable to WD 2110 through an interface or port. Antenna 2111, interface 2114, and/or processing circuitry 2120 can be configured to perform any receiving or transmitting operations described herein as being performed by a WD. Any information, data and/or signals can be received from a network node and/or another WD. In some embodiments, radio front end circuitry and/or antenna 2111 can be considered an interface.

As illustrated, interface 2114 comprises radio front end circuitry 2112 and antenna 2111. Radio front end circuitry 2112 comprise one or more filters 2118 and amplifiers 2116. Radio front end circuitry 2114 is connected to antenna 2111 and processing circuitry 2120 and can be configured to condition signals communicated between antenna 2111 and processing circuitry 2120. Radio front end circuitry 2112 can be coupled to or a part of antenna 2111. In some embodiments, WD 2110 may not include separate radio front end circuitry 2112; rather, processing circuitry 2120 can comprise radio front end circuitry and can be connected to antenna 2111. Similarly, in some embodiments, some or all of RF transceiver circuitry 2122 can be considered a part of interface 2114. Radio front end circuitry 2112 can receive digital data that is to be sent out to other network nodes or WDs via a wireless connection. Radio front end circuitry 2112 can convert the digital data into a radio signal having the appropriate channel and bandwidth parameters using a combination of filters 2118 and/or amplifiers 2116. The radio signal can then be transmitted via antenna 2111. Similarly, when receiving data, antenna 2111 can collect radio signals which are then converted into digital data by radio front end circuitry 2112. The digital data can be passed to processing circuitry 2120. In other embodiments, the interface can comprise different components and/or different combinations of components.

Processing circuitry 2120 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 2110 components, such as device readable medium 2130, WD 2110 functionality. Such functionality can include providing any of the various wireless features or benefits discussed herein. For example, processing circuitry 2120 can execute instructions stored in device readable medium 2130 or in memory within processing circuitry 2120 to provide the functionality disclosed herein.

As illustrated, processing circuitry 2120 includes one or more of RF transceiver circuitry 2122, baseband processing circuitry 2124, and application processing circuitry 2126. In other embodiments, the processing circuitry can comprise different components and/or different combinations of components. In certain embodiments processing circuitry 2120 of WD 2110 can comprise a SOC. In some embodiments, RF transceiver circuitry 2122, baseband processing circuitry 2124, and application processing circuitry 2126 can be on separate chips or sets of chips. In alternative embodiments, part or all of baseband processing circuitry 2124 and application processing circuitry 2126 can be combined into one chip or set of chips, and RF transceiver circuitry 2122 can be on a separate chip or set of chips. In still alternative embodiments, part or all of RF transceiver circuitry 2122 and baseband processing circuitry 2124 can be on the same chip or set of chips, and application processing circuitry 2126 can be on a separate chip or set of chips. In yet other alternative embodiments, part or all of RF transceiver circuitry 2122, baseband processing circuitry 2124, and application processing circuitry 2126 can be combined in the same chip or set of chips. In some embodiments, RF transceiver circuitry 2122 can be a part of interface 2114. RF transceiver circuitry 2122 can condition RF signals for processing circuitry 2120.

In certain embodiments, some or all of the functionality described herein as being performed by a WD can be provided by processing circuitry 2120 executing instructions stored on device readable medium 2130, which in certain embodiments can be a computer-readable storage medium. In alternative embodiments, some or all of the functionality can be provided by processing circuitry 2120 without executing instructions stored on a separate or discrete device readable storage medium, such as in a hard-wired manner. In any of those particular embodiments, whether executing instructions stored on a device readable storage medium or not, processing circuitry 2120 can be configured to perform the described functionality. The benefits provided by such functionality are not limited to processing circuitry 2120 alone or to other components of WD 2110, but are enjoyed by WD 2110 as a whole, and/or by end users and the wireless network generally.

Processing circuitry 2120 can be configured to perform any determining, calculating, or similar operations (e.g., certain obtaining operations) described herein as being performed by a WD. These operations, as performed by processing circuitry 2120, can include processing information obtained by processing circuitry 2120 by, for example, converting the obtained information into other information, comparing the obtained information or converted information to information stored by WD 2110, and/or performing one or more operations based on the obtained information or converted information, and as a result of said processing making a determination.

Device readable medium 2130 can be operable to store a computer program, software, an application including one or more of logic, rules, code, tables, etc. and/or other instructions capable of being executed by processing circuitry 2120. Device readable medium 2130 can include computer memory (e.g., Random Access Memory (RAM) or Read Only Memory (ROM)), mass storage media (e.g., a hard disk), removable storage media (e.g., a Compact Disk (CD)

or a Digital Video Disk (DVD)), and/or any other volatile or non-volatile, non-transitory device readable and/or computer executable memory devices that store information, data, and/or instructions that can be used by processing circuitry 2120. In some embodiments, processing circuitry 2120 and device readable medium 2130 can be considered to be integrated.

User interface equipment 2132 can include components that allow and/or facilitate a human user to interact with WD 2110. Such interaction can be of many forms, such as visual, audial, tactile, etc. User interface equipment 2132 can be operable to produce output to the user and to allow and/or facilitate the user to provide input to WD 2110. The type of interaction can vary depending on the type of user interface equipment 2132 installed in WD 2110. For example, if WD 2110 is a smart phone, the interaction can be via a touch screen; if WD 2110 is a smart meter, the interaction can be through a screen that provides usage (e.g., the number of gallons used) or a speaker that provides an audible alert (e.g., if smoke is detected). User interface equipment 2132 can include input interfaces, devices and circuits, and output interfaces, devices and circuits. User interface equipment 2132 can be configured to allow and/or facilitate input of information into WD 2110 and is connected to processing circuitry 2120 to allow and/or facilitate processing circuitry 2120 to process the input information. User interface equipment 2132 can include, for example, a microphone, a proximity or other sensor, keys/buttons, a touch display, one or more cameras, a USB port, or other input circuitry. User interface equipment 2132 is also configured to allow and/or facilitate output of information from WD 2110, and to allow and/or facilitate processing circuitry 2120 to output information from WD 2110. User interface equipment 2132 can include, for example, a speaker, a display, vibrating circuitry, a USB port, a headphone interface, or other output circuitry. Using one or more input and output interfaces, devices, and circuits, of user interface equipment 2132, WD 2110 can communicate with end users and/or the wireless network, and allow and/or facilitate them to benefit from the functionality described herein.

Auxiliary equipment 2134 is operable to provide more specific functionality which may not be generally performed by WDs. This can comprise specialized sensors for doing measurements for various purposes, interfaces for additional types of communication such as wired communications etc. The inclusion and type of components of auxiliary equipment 2134 can vary depending on the embodiment and/or scenario.

Power source 2136 can, in some embodiments, be in the form of a battery or battery pack. Other types of power sources, such as an external power source (e.g., an electricity outlet), photovoltaic devices or power cells, can also be used. WD 2110 can further comprise power circuitry 2137 for delivering power from power source 2136 to the various parts of WD 2110 which need power from power source 2136 to carry out any functionality described or indicated herein. Power circuitry 2137 can in certain embodiments comprise power management circuitry. Power circuitry 2137 can additionally or alternatively be operable to receive power from an external power source; in which case WD 2110 can be connectable to the external power source (such as an electricity outlet) via input circuitry or an interface such as an electrical power cable. Power circuitry 2137 can also in certain embodiments be operable to deliver power from an external power source to power source 2136. This can be, for example, for the charging of power source 2136. Power circuitry 2137 can perform any converting or other modification to the power from power source 2136 to make it suitable for supply to the respective components of WD 2110.

Figure 22:
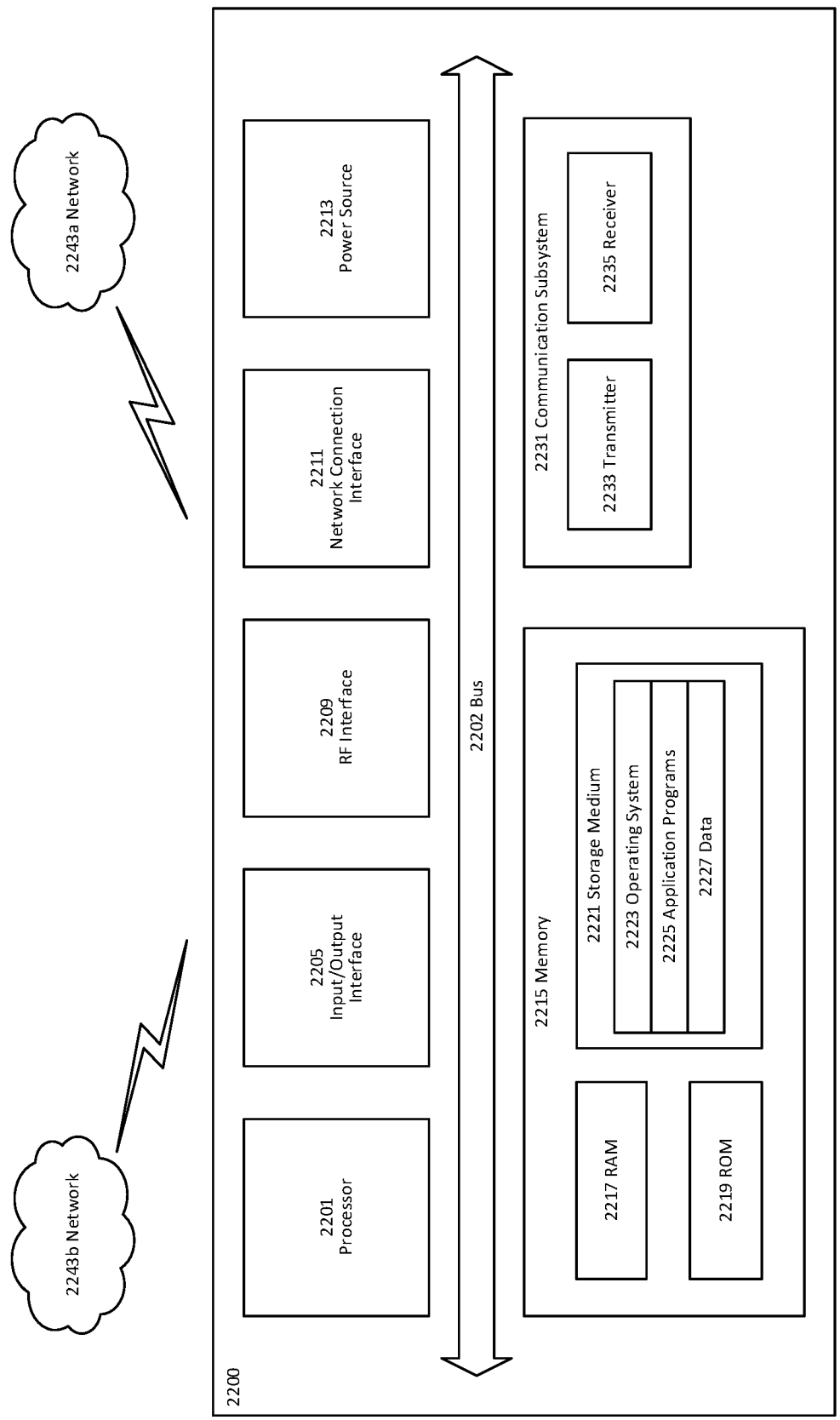
FIG. 22 illustrates an example user equipment (UE) in accordance with some embodiments.

FIG. 22 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 22200 can be any UE identified by the $3^{rd}$ Generation Partnership Project (3GPP), including a NB-IoT UE, a machine type communication (MTC) UE, and/or an enhanced MTC (eMTC) UE. UE 2200, as illustrated in FIG. 22, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 22 is a UE, the components discussed herein are equally applicable to a WD, and vice-versa.

In FIG. 22, UE 2200 includes processing circuitry 2201 that is operatively coupled to input/output interface 2205, radio frequency (RF) interface 2209, network connection interface 2211, memory 2215 including random access memory (RAM) 2217, read-only memory (ROM) 2219, and storage medium 2221 or the like, communication subsystem 2231, power source 2233, and/or any other component, or any combination thereof. Storage medium 2221 includes operating system 2223, application program 2225, and data 2227. In other embodiments, storage medium 2221 can include other similar types of information. Certain UEs can utilize all of the components shown in FIG. 22, or only a subset of the components. The level of integration between the components can vary from one UE to another UE. Further, certain UEs can contain multiple instances of a component, such as multiple processors, memories, transceivers, transmitters, receivers, etc.

In FIG. 22, processing circuitry 2201 can be configured to process computer instructions and data. Processing circuitry 2201 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2201 can include two central processing units (CPUs). Data can be information in a form suitable for use by a computer.

In the depicted embodiment, input/output interface 2205 can be configured to provide a communication interface to an input device, output device, or input and output device. UE 2200 can be configured to use an output device via input/output interface 2205. An output device can use the same type of interface port as an input device. For example, a USB port can be used to provide input to and output from UE 2200. The output device can be a speaker, a sound card, a video card, a display, a monitor, a printer, an actuator, an emitter, a smartcard, another output device, or any combination thereof. UE 2200 can be configured to use an input device via input/output interface 2205 to allow and/or facilitate a user to capture information into UE 2200. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 22, RF interface 2209 can be configured to provide a communication interface to RF components such as a transmitter, a receiver, and an antenna. Network connection interface 2211 can be configured to provide a communication interface to network 2243*a*. Network 2243*a* can encompass wired and/or wireless networks such as a local-area network (LAN), a wide-area network (WAN), a computer network, a wireless network, a telecommunications network, another like network or any combination thereof. For example, network 2243*a* can comprise a Wi-Fi network. Network connection interface 2211 can be configured to include a receiver and a transmitter interface used to communicate with one or more other devices over a communication network according to one or more communication protocols, such as Ethernet, TCP/IP, SONET, ATM, or the like. Network connection interface 2211 can implement receiver and transmitter functionality appropriate to the communication network links (e.g., optical, electrical, and the like). The transmitter and receiver functions can share circuit components, software or firmware, or alternatively can be implemented separately.

RAM 2217 can be configured to interface via bus 2202 to processing circuitry 2201 to provide storage or caching of data or computer instructions during the execution of software programs such as the operating system, application programs, and device drivers. ROM 2219 can be configured to provide computer instructions or data to processing circuitry 2201. For example, ROM 2219 can be configured to store invariant low-level system code or data for basic system functions such as basic input and output (I/O), startup, or reception of keystrokes from a keyboard that are stored in a non-volatile memory. Storage medium 2221 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2221 can be configured to include operating system 2223, application program 2225 such as a web browser application, a widget or gadget engine or another application, and data file 2227. Storage medium 2221 can store, for use by UE 2200, any of a variety of various operating systems or combinations of operating systems.

Storage medium 2221 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2221 can allow and/or facilitate UE 2200 to access computer-executable instructions, application programs or the like, stored on transitory or non-transitory memory media, to off-load data, or to upload data. An article of manufacture, such as one utilizing a communication system can be tangibly embodied in storage medium 2221, which can comprise a device readable medium.

In FIG. 22, processing circuitry 2201 can be configured to communicate with network 2243*b* using communication subsystem 2231. Network 2243*a* and network 2243*b* can be the same network or networks or different network or networks. Communication subsystem 2231 can be configured to include one or more transceivers used to communicate with network 2243*b*. For example, communication subsystem 2231 can be configured to include one or more transceivers used to communicate with one or more remote transceivers of another device capable of wireless communication such as another WD, UE, or base station of a radio access network (RAN) according to one or more communication protocols, such as IEEE 802.22, CDMA, WCDMA, GSM, LTE, UTRAN, WiMax, or the like. Each transceiver can include transmitter 2233 and/or receiver 2235 to implement transmitter or receiver functionality, respectively, appropriate to the RAN links (e.g., frequency allocations and the like). Further, transmitter 2233 and receiver 2235 of each transceiver can share circuit components, software or firmware, or alternatively can be implemented separately.

In the illustrated embodiment, the communication functions of communication subsystem 2231 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 2231 can include cellular communication, Wi-Fi communication, Bluetooth communication, and GPS communication. Network 2243*b* can encompass wired and/or wireless networks such as a local-area network (LAN), a wide-area network (WAN), a computer network, a wireless network, a telecommunications network, another like network or any combination thereof. For example, network 2243*b* can be a cellular network, a Wi-Fi network, and/or a near-field network. Power source 2213 can be configured to provide alternating current (AC) or direct current (DC) power to components of UE 2200.

The features, benefits and/or functions described herein can be implemented in one of the components of UE 2200 or partitioned across multiple components of UE 2200. Further, the features, benefits, and/or functions described herein can be implemented in any combination of hardware, software or firmware. In one example, communication subsystem 2231 can be configured to include any of the components described herein. Further, processing circuitry 2201 can be configured to communicate with any of such components over bus 2202. In another example, any of such components can be represented by program instructions stored in memory that when executed by processing circuitry 2201 perform the corresponding functions described herein. In another example, the functionality of any of such components can be partitioned between processing circuitry 2201 and communication subsystem 2231. In another example, the non-computationally intensive functions of any of such components can be implemented in software or firmware and the computationally intensive functions can be implemented in hardware.

Figure 23:
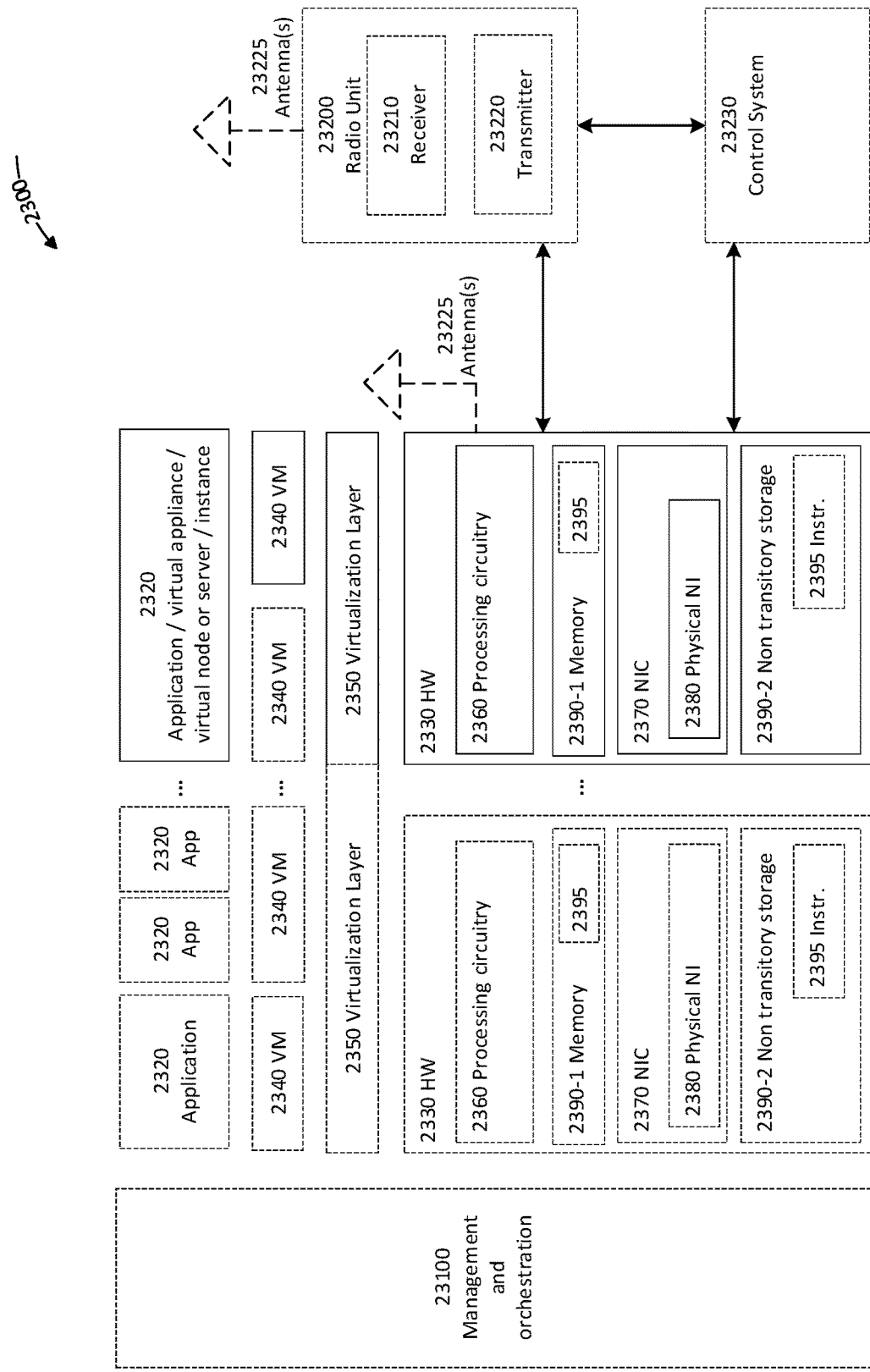
FIG. 23 illustrates an example virtualization environment in accordance with some embodiments.

FIG. 23 is a schematic block diagram illustrating a virtualization environment 2300 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 2300 hosted by one or more of hardware nodes 2330. Further, in embodiments in which the virtual node is not a radio access node or does not require radio connectivity (e.g., a core network node), then the network node can be entirely virtualized.

The functions can be implemented by one or more applications 2320 (which can alternatively be called software instances, virtual appliances, network functions, virtual nodes, virtual network functions, etc.) operative to implement some of the features, functions, and/or benefits of some of the embodiments disclosed herein. Applications 2320 are run in virtualization environment 2300 which provides hardware 2330 comprising processing circuitry 2360 and memory 2390. Memory 2390 contains instructions 2395 executable by processing circuitry 2360 whereby application 2320 is operative to provide one or more of the features, benefits, and/or functions disclosed herein.

Virtualization environment 2300 comprises general-purpose or special-purpose network hardware devices 2330 comprising a set of one or more processors or processing circuitry 2360, which can be commercial off-the-shelf (COTS) processors, dedicated Application Specific Integrated Circuits (ASICs), or any other type of processing circuitry including digital or analog hardware components or special purpose processors. Each hardware device can comprise memory 2390-1 which can be non-persistent memory for temporarily storing instructions 2395 or software executed by processing circuitry 2360. Each hardware device can comprise one or more network interface controllers (NICs) 2370, also known as network interface cards, which include physical network interface 2380. Each hardware device can also include non-transitory, persistent, machine-readable storage media 2390-2 having stored therein software 2395 and/or instructions executable by processing circuitry 2360. Software 2395 can include any type of software including software for instantiating one or more virtualization layers 2350 (also referred to as hypervisors), software to execute virtual machines 2340 as well as software allowing it to execute functions, features and/or benefits described in relation with some embodiments described herein.

Virtual machines 2340, comprise virtual processing, virtual memory, virtual networking or interface and virtual storage, and can be run by a corresponding virtualization layer 2350 or hypervisor. Different embodiments of the instance of virtual appliance 2320 can be implemented on one or more of virtual machines 2340, and the implementations can be made in different ways.

During operation, processing circuitry 2360 executes software 2395 to instantiate the hypervisor or virtualization layer 2350, which can sometimes be referred to as a virtual machine monitor (VMM). Virtualization layer 2350 can present a virtual operating platform that appears like networking hardware to virtual machine 2340.

As shown in FIG. 23, hardware 2330 can be a standalone network node with generic or specific components. Hardware 2330 can comprise antenna 23225 and can implement some functions via virtualization. Alternatively, hardware 2330 can be part of a larger cluster of hardware (e.g. such as in a data center or customer premise equipment (CPE)) where many hardware nodes work together and are managed via management and orchestration (MANO) 23100, which, among others, oversees lifecycle management of applications 2320.

Virtualization of the hardware is in some contexts referred to as network function virtualization (NFV). NFV can be used to consolidate many network equipment types onto industry standard high-volume server hardware, physical switches, and physical storage, which can be located in data centers, and customer premise equipment.

In the context of NFV, virtual machine 2340 can be a software implementation of a physical machine that runs programs as if they were executing on a physical, non-virtualized machine. Each of virtual machines 2340, and that part of hardware 2330 that executes that virtual machine, be it hardware dedicated to that virtual machine and/or hardware shared by that virtual machine with others of the virtual machines 2340, forms a separate virtual network elements (VNE).

Still in the context of NFV, Virtual Network Function (VNF) is responsible for handling specific network functions that run in one or more virtual machines 2340 on top of hardware networking infrastructure 2330 and corresponds to application 2320 in FIG. 23.

In some embodiments, one or more radio units 23200 that each include one or more transmitters 23220 and one or more receivers 23210 can be coupled to one or more antennas 23225. Radio units 23200 can communicate directly with hardware nodes 2330 via one or more appropriate network interfaces and can be used in combination with the virtual components to provide a virtual node with radio capabilities, such as a radio access node or a base station.

In some embodiments, some signalling can be effected with the use of control system 23230 which can alternatively be used for communication between the hardware nodes 2330 and radio units 23200.

Figure 24:
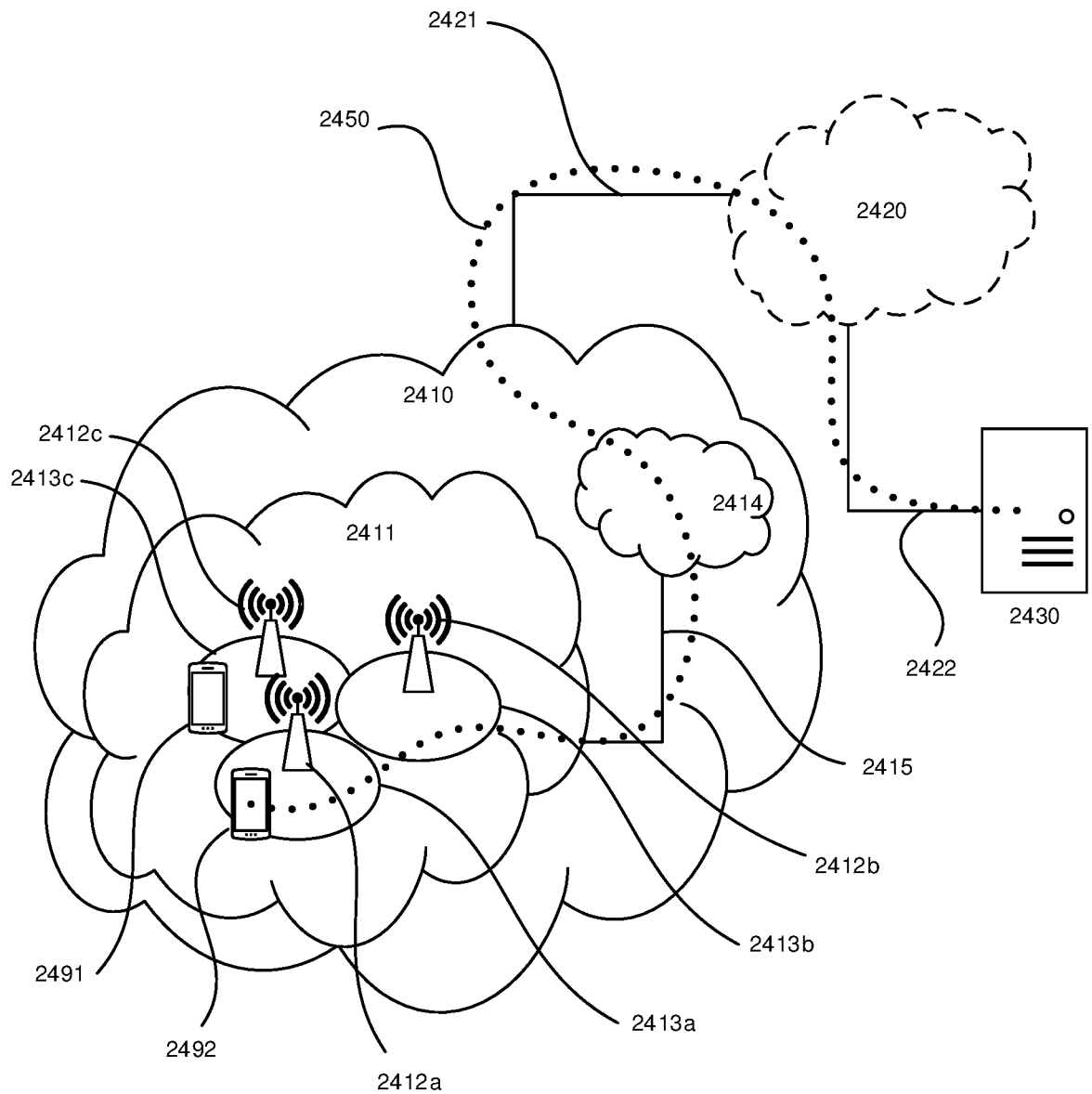
FIG. 24 shows a telecommunication network connected via an intermediate network to a host computer in accordance with some embodiments.

With reference to FIG. 24, in accordance with an embodiment, a communication system includes telecommunication network 2410, such as a 3GPP-type cellular network, which comprises access network 2411, such as a radio access network, and core network 2414. Access network 2411 comprises a plurality of base stations 2412a, 2412b, 2412c, such as NBs, eNBs, gNBs or other types of wireless access points, each defining a corresponding coverage area 2413a, 2413b, 2413c. Each base station 2412a, 2412b, 2412c is connectable to core network 2414 over a wired or wireless connection 2415. A first UE 2491 located in coverage area 2413c can be configured to wirelessly connect to, or be paged by, the corresponding base station 2412c. A second UE 2492 in coverage area 2413a is wirelessly connectable to the corresponding base station 2412*a*. While a plurality of UEs 2491, 2492 are illustrated in this example, the disclosed embodiments are equally applicable to a situation where a sole UE is in the coverage area or where a sole UE is connecting to the corresponding base station 2412.

Telecommunication network 2410 is itself connected to host computer 2430, which can be embodied in the hardware and/or software of a standalone server, a cloud-implemented server, a distributed server or as processing resources in a server farm. Host computer 2430 can be under the ownership or control of a service provider or can be operated by the service provider or on behalf of the service provider. Connections 2421 and 2422 between telecommunication network 2410 and host computer 2430 can extend directly from core network 2414 to host computer 2430 or can go via an optional intermediate network 2420. Intermediate network 2420 can be one of, or a combination of more than one of, a public, private or hosted network; intermediate network 2420, if any, can be a backbone network or the Internet; in particular, intermediate network 2420 can comprise two or more sub-networks (not shown).

The communication system of FIG. 24 as a whole enables connectivity between the connected UEs 2491, 2492 and host computer 2430. The connectivity can be described as an over-the-top (OTT) connection 2450. Host computer 2430 and the connected UEs 2491, 2492 are configured to communicate data and/or signaling via OTT connection 2450, using access network 2411, core network 2414, any intermediate network 2420 and possible further infrastructure (not shown) as intermediaries. OTT connection 2450 can be transparent in the sense that the participating communication devices through which OTT connection 2450 passes are unaware of routing of uplink and downlink communications. For example, base station 2412 may not or need not be informed about the past routing of an incoming downlink communication with data originating from host computer 2430 to be forwarded (e.g., handed over) to a connected UE 2491. Similarly, base station 2412 need not be aware of the future routing of an outgoing uplink communication originating from the UE 2491 towards the host computer 2430.

Example implementations, in accordance with an embodiment, of the UE, base station and host computer discussed in the preceding paragraphs will now be described with reference to FIG. 25. In communication system 2500, host computer 2510 comprises hardware 2515 including communication interface 2516 configured to set up and maintain a wired or wireless connection with an interface of a different communication device of communication system 2500. Host computer 2510 further comprises processing circuitry 2518, which can have storage and/or processing capabilities. In particular, processing circuitry 2518 can comprise one or more programmable processors, application-specific integrated circuits, field programmable gate arrays or combinations of these (not shown) adapted to execute instructions. Host computer 2510 further comprises software 2511, which is stored in or accessible by host computer 2510 and executable by processing circuitry 2518. Software 2511 includes host application 2512. Host application 2512 can be operable to provide a service to a remote user, such as UE 2530 connecting via OTT connection 2550 terminating at UE 2530 and host computer 2510. In providing the service to the remote user, host application 2512 can provide user data which is transmitted using OTT connection 2550. Communication system 2500 can also include base station 2520 provided in a telecommunication system and comprising hardware 2525 enabling it to communicate with host computer 2510 and with UE 2530. Hardware 2525 can include communication interface 2526 for setting up and maintaining a wired or wireless connection with an interface of a different communication device of communication system 2500, as well as radio interface 2527 for setting up and maintaining at least wireless connection 2570 with UE 2530 located in a coverage area (not shown in FIG. 25) served by base station 2520. Communication interface 2526 can be configured to facilitate connection 2560 to host computer 2510. Connection 2560 can be direct or it can pass through a core network (not shown in FIG. 25) of the telecommunication system and/or through one or more intermediate networks outside the telecommunication system. In the embodiment shown, hardware 2525 of base station 2520 can also include processing circuitry 2528, which can comprise one or more programmable processors, application-specific integrated circuits, field programmable gate arrays or combinations of these (not shown) adapted to execute instructions. Base station 2520 further has software 2521 stored internally or accessible via an external connection.

Communication system 2500 can also include UE 2530 already referred to. Its hardware 2535 can include radio interface 2537 configured to set up and maintain wireless connection 2570 with a base station serving a coverage area in which UE 2530 is currently located. Hardware 2535 of UE 2530 can also include processing circuitry 2538, which can comprise one or more programmable processors, application-specific integrated circuits, field programmable gate arrays or combinations of these (not shown) adapted to execute instructions. UE 2530 further comprises software 2531, which is stored in or accessible by UE 2530 and executable by processing circuitry 2538. Software 2531 includes client application 2532. Client application 2532 can be operable to provide a service to a human or non-human user via UE 2530, with the support of host computer 2510. In host computer 2510, an executing host application 2512 can communicate with the executing client application 2532 via OTT connection 2550 terminating at UE 2530 and host computer 2510. In providing the service to the user, client application 2532 can receive request data from host application 2512 and provide user data in response to the request data. OTT connection 2550 can transfer both the request data and the user data. Client application 2532 can interact with the user to generate the user data that it provides.

Figure 25:
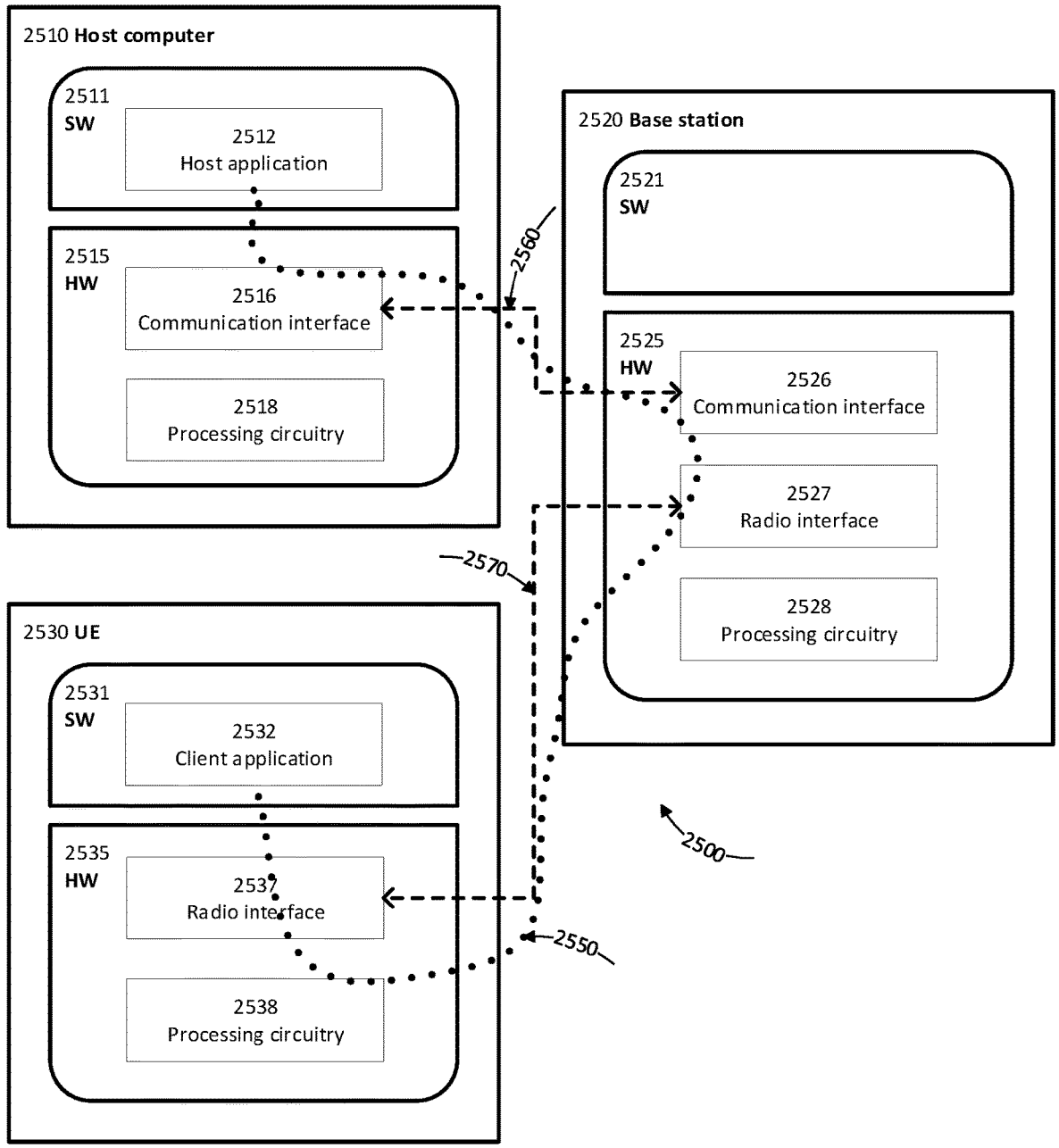
FIG. 25 illustrates a host computer communicating via a base station with a user equipment over a partially-wireless connection in accordance with some embodiments.

It is noted that host computer 2510, base station 2520 and UE 2530 illustrated in FIG. 25 can be similar or identical to host computer 2430, one of base stations 2412*a*, 2412*b*, 2412*c* and one of UEs 2491, 2492 of FIG. 24, respectively. This is to say, the inner workings of these entities can be as shown in FIG. 25 and independently, the surrounding network topology can be that of FIG. 24.

In FIG. 25, OTT connection 2550 has been drawn abstractly to illustrate the communication between host computer 2510 and UE 2530 via base station 2520, without explicit reference to any intermediary devices and the precise routing of messages via these devices. Network infrastructure can determine the routing, which it can be configured to hide from UE 2530 or from the service provider operating host computer 2510, or both. While OTT connection 2550 is active, the network infrastructure can further take decisions by which it dynamically changes the routing (e.g., on the basis of load balancing consideration or reconfiguration of the network).

Wireless connection 2570 between UE 2530 and base station 2520 is in accordance with the teachings of the embodiments described throughout this disclosure. One or more of the various embodiments improve the performance of OTT services provided to UE 2530 using OTT connection 2550, in which wireless connection 2570 forms the last segment. More precisely, the exemplary embodiments disclosed herein enable proper routing of the incoming packets to the proper path (i.e., a next IAB node or the destination UE), as well as the mapping to the proper bearer in that path by enhancing the F1-AP and RRC protocols. The techniques described herein take advantage of existing RRC and F1-AP protocols, or even existing procedures, to realize the setup and reconfiguration of adaptation layers that are needed for routing packets to the right path (i.e., next node) and mapping them to the right bearer within the correct path. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 2550 between host computer 2510 and UE 2530, in response to variations in the measurement results. The measurement procedure and/or the network functionality for reconfiguring OTT connection 2550 can be implemented in software 2511 and hardware 2515 of host computer 2510 or in software 2531 and hardware 2535 of UE 2530, or both. In embodiments, sensors (not shown) can be deployed in or in association with communication devices through which OTT connection 2550 passes; the sensors can participate in the measurement procedure by supplying values of the monitored quantities exemplified above or supplying values of other physical quantities from which software 2511, 2531 can compute or estimate the monitored quantities. The reconfiguring of OTT connection 2550 can include message format, retransmission settings, preferred routing etc.; the reconfiguring need not affect base station 2520, and it can be unknown or imperceptible to base station 2520. Such procedures and functionalities can be known and practiced in the art. In certain embodiments, measurements can involve proprietary UE signaling facilitating host computer 2510's measurements of throughput, propagation times, latency and the like. The measurements can be implemented in that software 2511 and 2531 causes messages to be transmitted, in particular empty or 'dummy' messages, using OTT connection 2550 while it monitors propagation times, errors etc.

Figure 2:
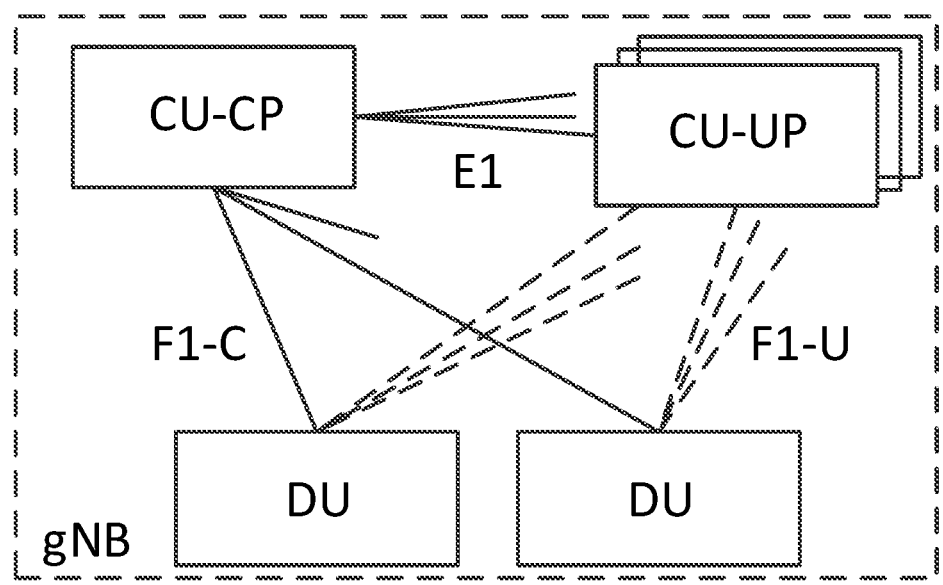
FIG. 2 shows the separation of the control plane (CP) and user plane (UP) in the control unit (CU) of a gNB.
Figure 3:
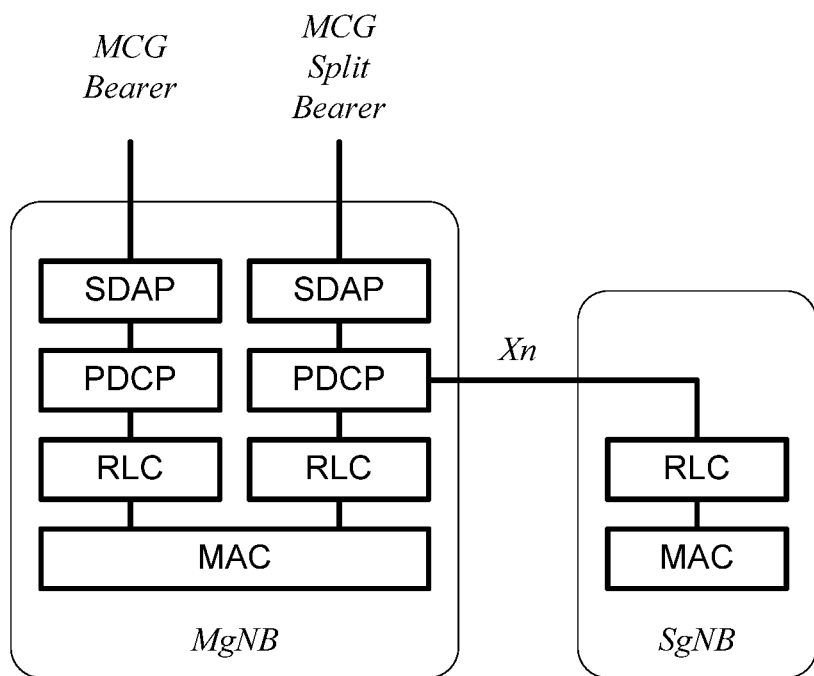
FIG. 3 illustrates the handling of master gNB bearers in a dual connectivity scenario.
Figure 4:
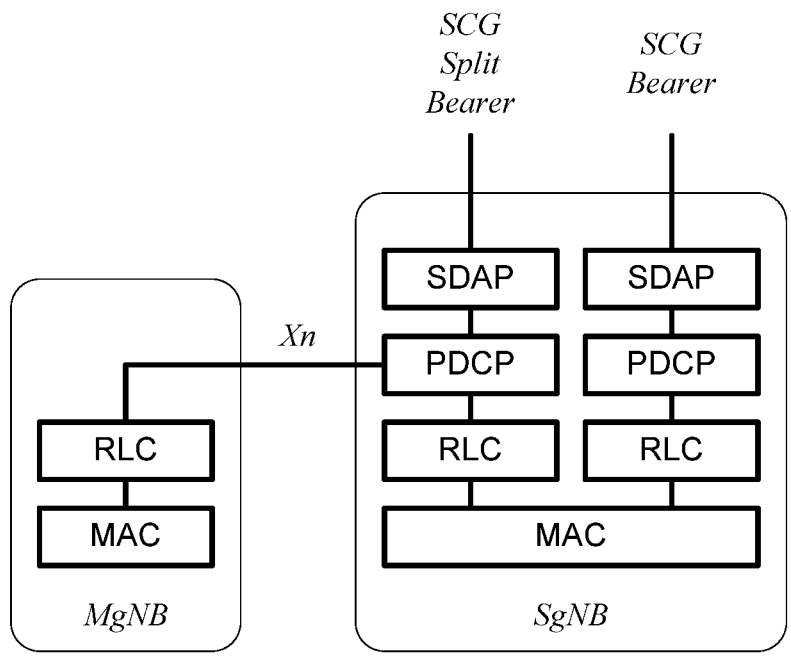
FIG. 4 illustrates the handling of secondary gNB bearers in a dual connectivity scenario.
Figure 5:
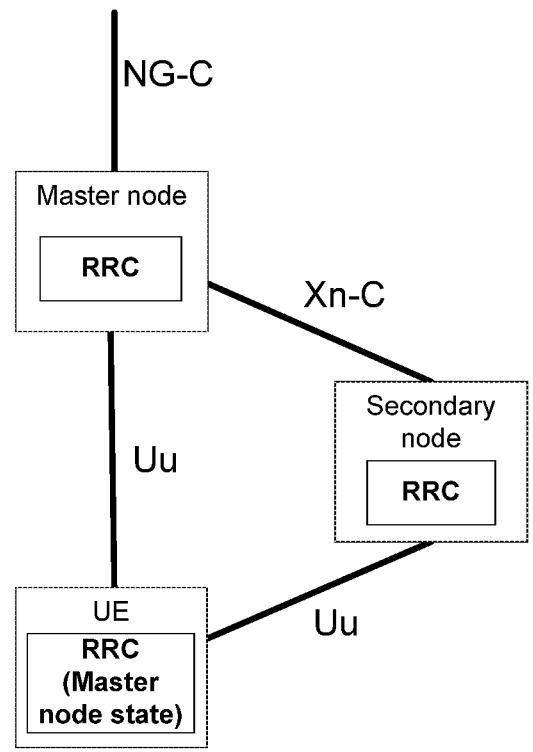
FIG. 5 illustrates principles of multi-RAT dual connectivity (MR-DC) in 5G.
Figure 6:
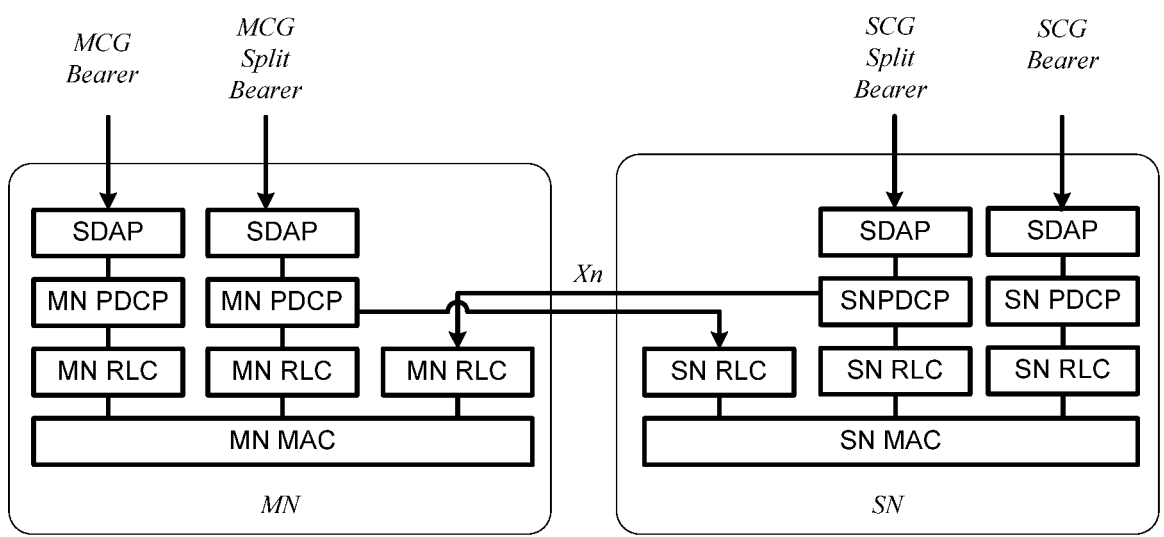
FIG. 6 shows a radio protocol architecture for split bearer handling in MR-DC in 5G.
Figure 7:
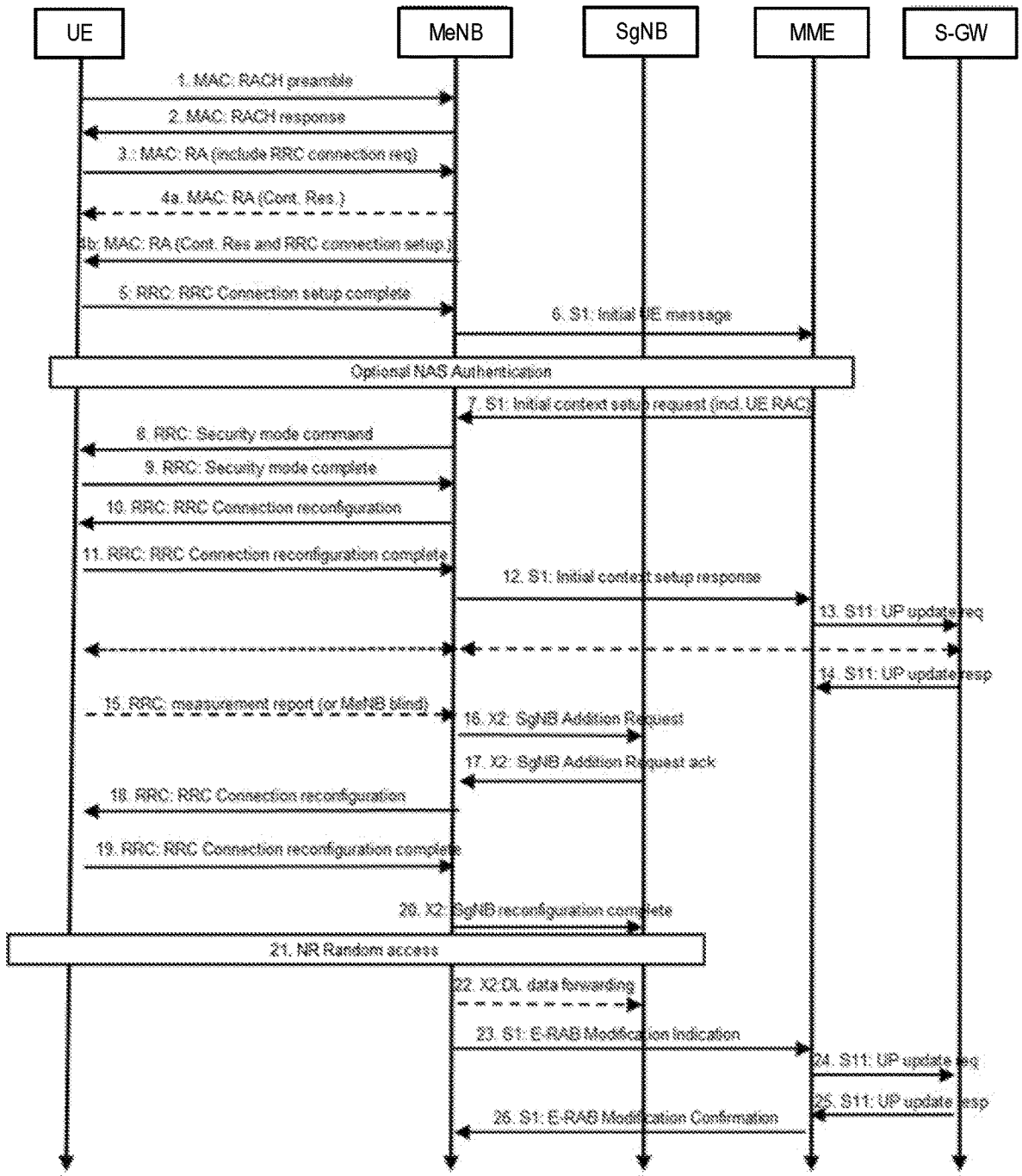
FIG. 7 is a signal-flow diagram illustrating non-standalone connection setup via EN-DC, in NR.
Figure 8:
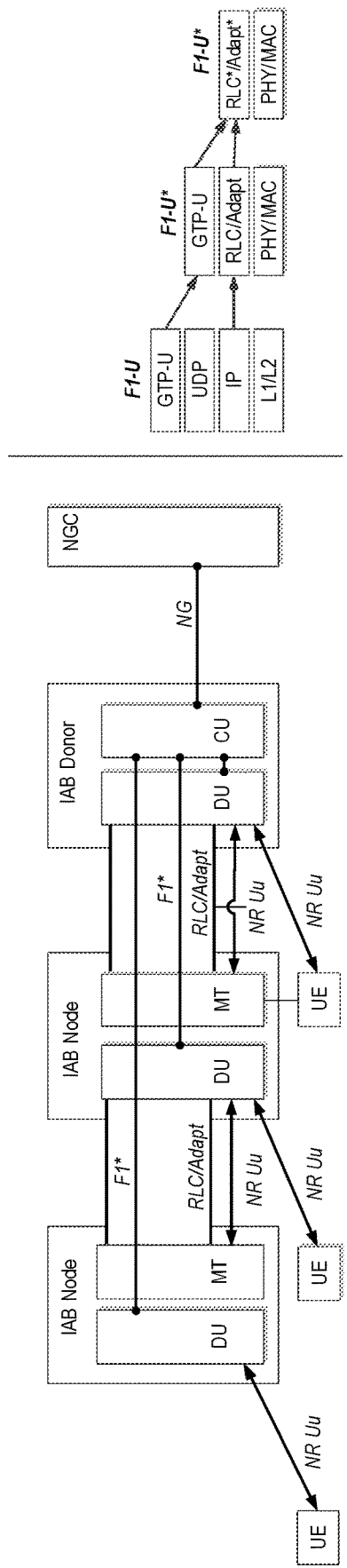
FIGS. 8, 9, 10, 11, and 12 show reference diagrams for IAB architectures 1a, 1b, 2a, 2b, and 2c, respectively.
Figure 9:
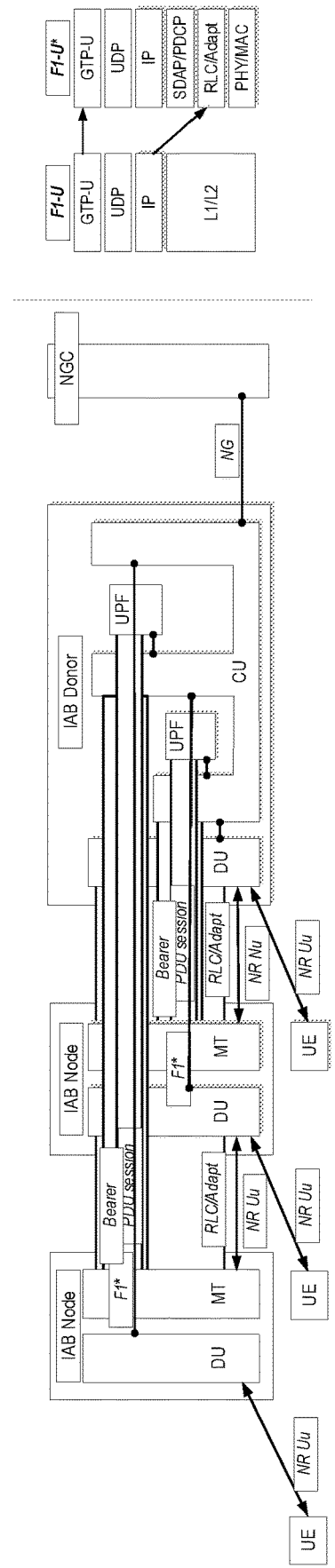
Figure 10:
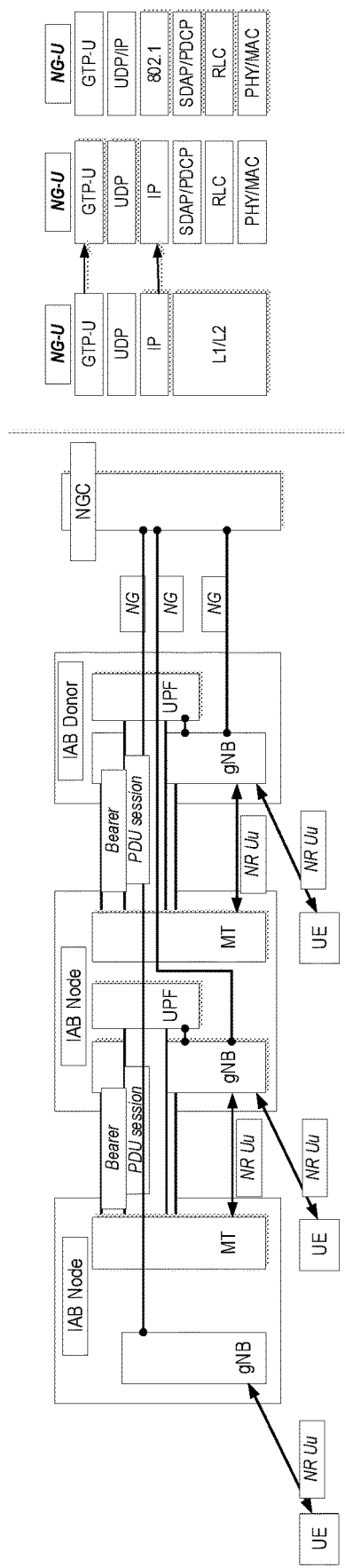
Figure 11:
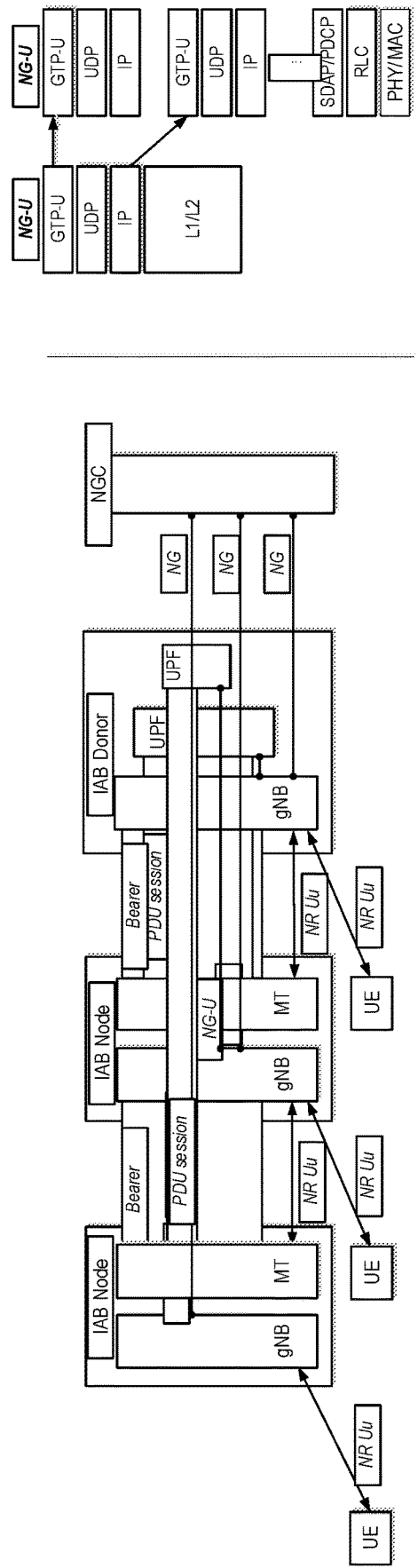
Figure 12:
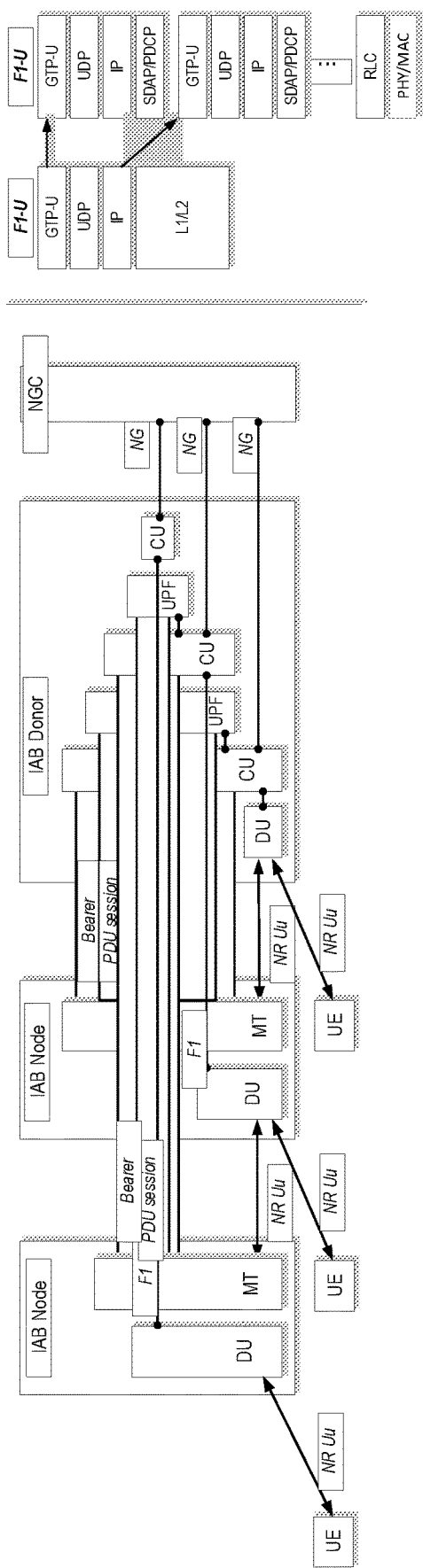
Figure 13:
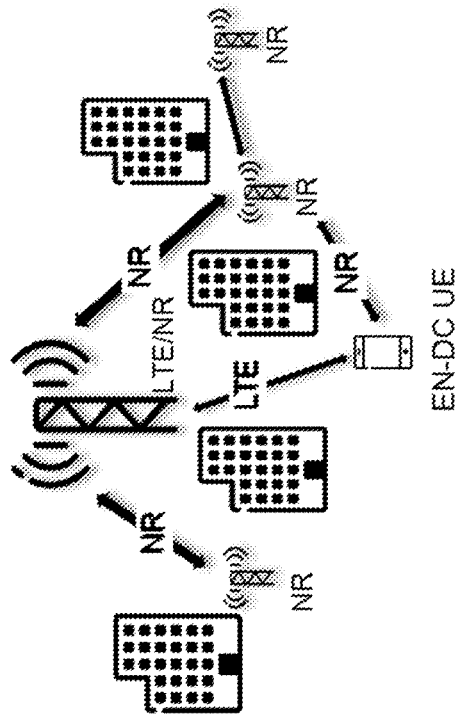
FIG. 13 illustrates an IAB scenario with a UE in EN-DC mode and the IAB node connected via standalone NR.
Figure 14:
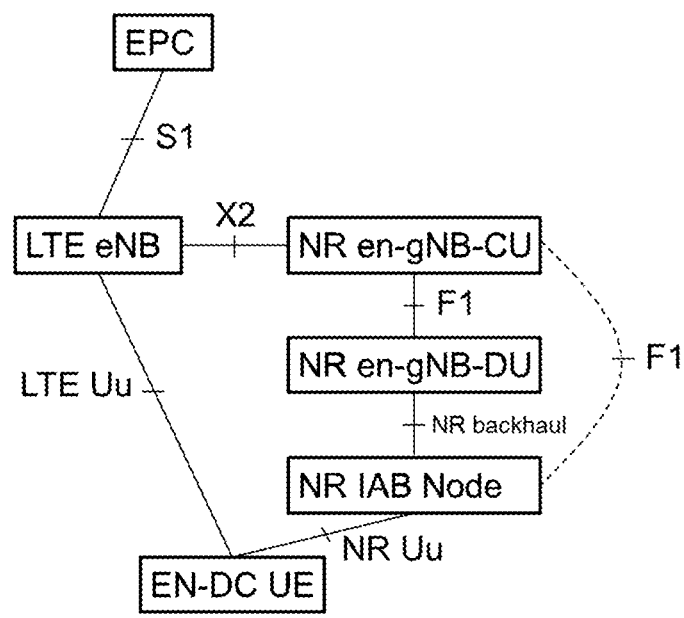
FIG. 14 illustrates an IAB logical network architecture corresponding to the scenario of FIG. 13.
Figure 15:
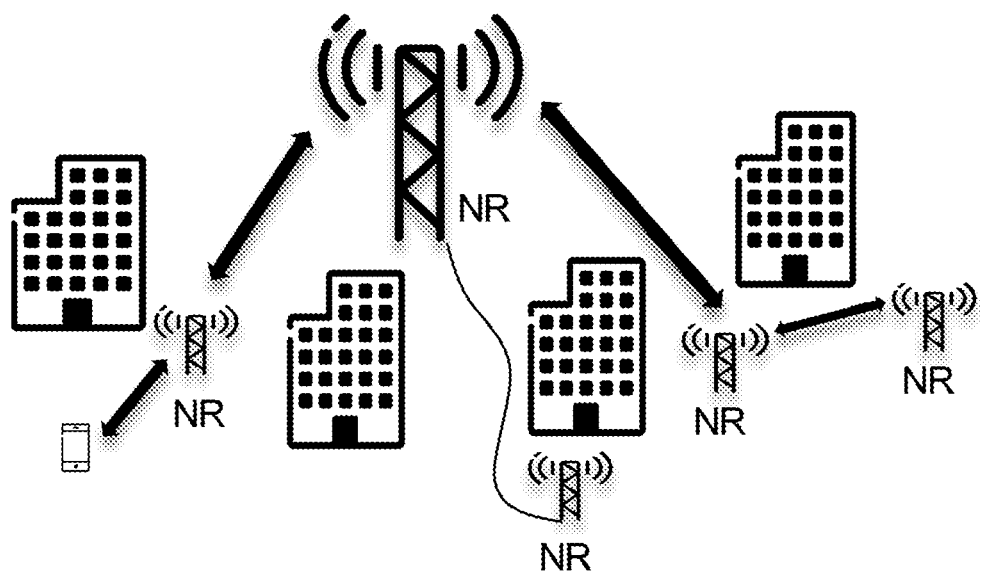
FIG. 15 illustrates an IAB scenario with a UE and IAB node connected via standalone NR.
Figure 16:
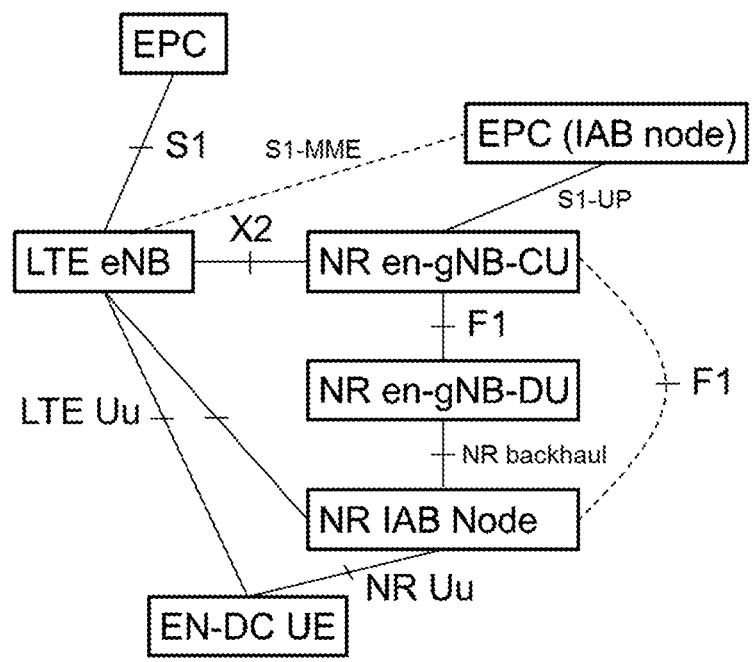
FIG. 16 shows an IAB architecture with a UE and some IAB nodes connected via EN-DC.

In some exemplary embodiments, the base station 2520 in FIG. 25 comprises the distributed architecture of 5G, such as reflected in FIGS. 1 and 2. For example, FIG. 26 below shows the base station 2520 with a central unit 2610 (e.g., gNB-CU) and at least one distributed unit 2630 (e.g., gNB-DUs).

The base station 2520 may be a donor gNB in some exemplary embodiments, with an F1 interface defined between the central unit 2610 and each of the distributed units 2630, adapted to configure an adaptation layer in a relay node that communicates with the central unit through a distributed unit 2630 of the donor gNB. The central unit 2610 may have processing circuitry configured to use RRC signaling to establish a connection with an MT part of the relay node, via the distributed unit of the donor base station and, after establishing the connection, signal with the MT part of the relay node to configure an adaptation layer in a protocol stack for the MT part of the relay node, the adaptation layer providing for routing of incoming packets to one or more further relay nodes or to one or more UEs connected to the relay node and for mapping of those incoming packets to bearers. The processing circuitry may be further configured to configure an adaptation layer at the distributed unit of the donor base station, the adaptation layer at the distributed unit of the donor base station being configured to route incoming packets to a proper relay node of one or more relay nodes downstream of the donor base station.

Figure 27:
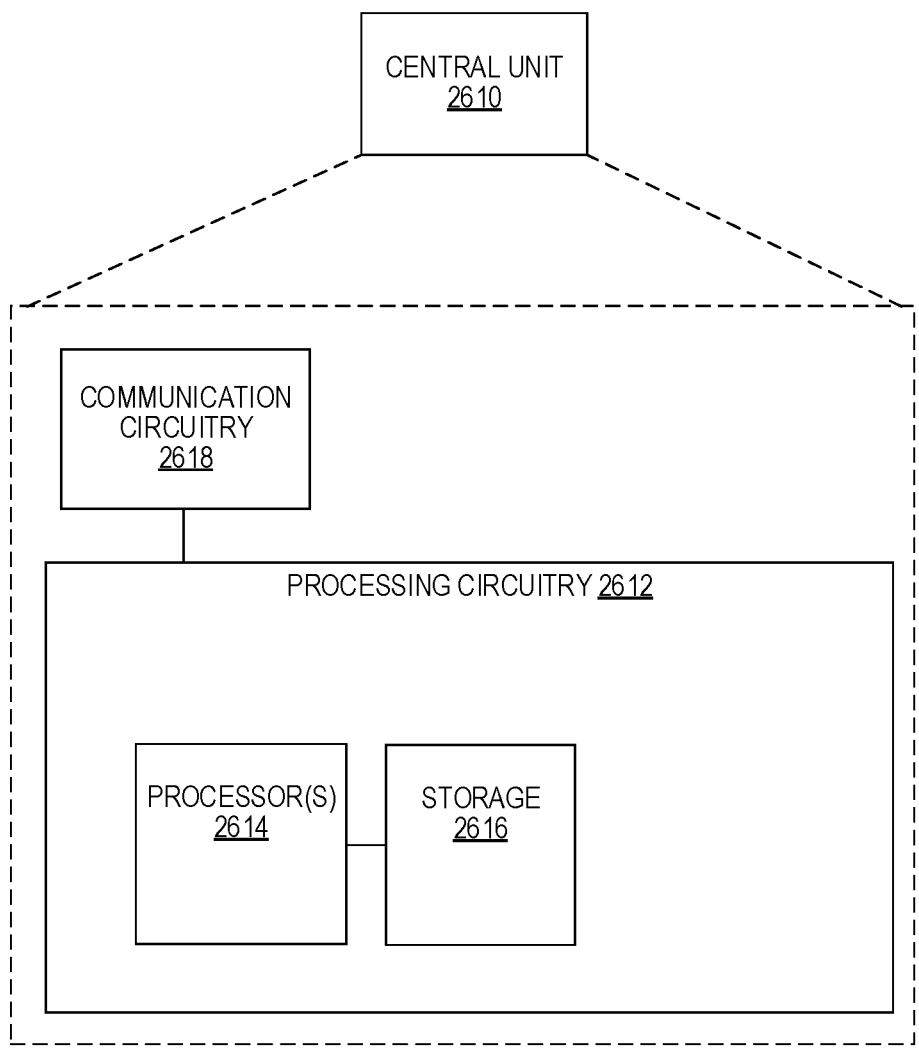
FIG. 27 shows a central unit in accordance with some embodiments.

FIG. 27 illustrates an exemplary embodiment of a central unit 2610. The central unit 2610 may be part of a base station, such as a donor gNB. The central unit 2610 (e.g., gNB-CU) may be connected to and control radio access points, or distributed units (e.g., gNB-DUs). The central unit 2610 may include communication circuitry 2618 for communicating with radio access points (e.g., gNB-DUs 2630) and with other equipment in the core network (e.g., 5GC).

The central unit 2610 may include processing circuitry 2612 that is operatively associated with the communication circuitry 2618. In an example embodiment, the processing circuitry 2612 comprises one or more digital processors 2614, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuitry 2612 may comprise fixed circuitry, or programmable circuitry that is specially configured via the execution of program instructions implementing the functionality taught herein.

The processing circuitry 2612 also includes or is associated with storage 2616. The storage 2616, in some embodiments, stores one or more computer programs and, optionally, configuration data. The storage 2616 provides non-transitory storage for the computer program and it may comprise one or more types of computer-readable media, such as disk storage, solid-state memory storage, or any mix thereof. By way of non-limiting example, the storage 2616 comprises any one or more of SRAM, DRAM, EEPROM, and FLASH memory.

In general, the storage 2616 comprises one or more types of computer-readable storage media providing non-transitory storage of the computer program and any configuration data used by the base station. Here, "non-transitory" means permanent, semi-permanent, or at least temporarily persistent storage and encompasses both long-term storage in non-volatile memory and storage in working memory, e.g., for program execution.

In some embodiments, the processing circuitry 2612 is configured to perform the method shown in FIG. 35, which will be described in detail below.

Figure 26:
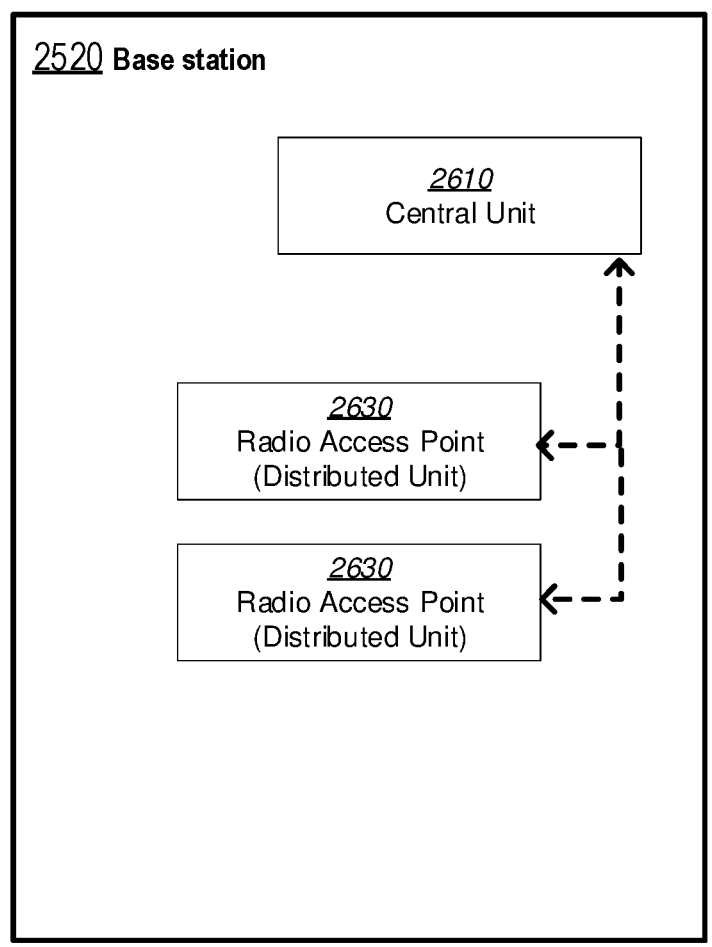
FIG. 26 shows a base station with distributed 5G architecture in accordance with some embodiments.
Figure 28:
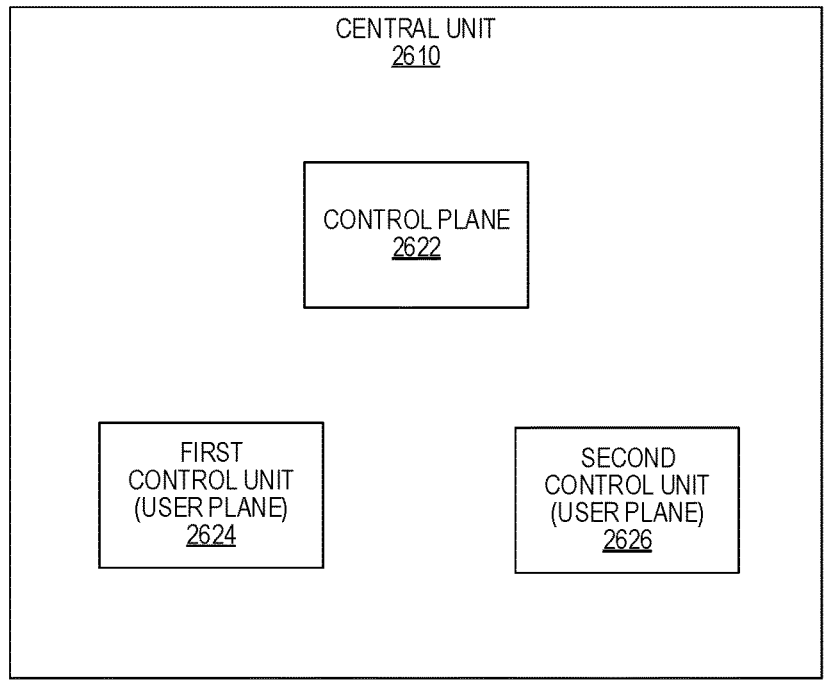
FIG. 28 illustrates an example central unit design in accordance with some embodiments.

As explained earlier, a gNB-CU may be split into multiple entities. This includes gNB-CU-UPs, which serve the user plane and host the PDCP protocol, and one gNB-CU-CP, which serves the control plane and hosts the PDCP and RRC protocol. These two entities are shown as separate control units in FIG. 28, as control plane 2622 and first and second (user plane) control units 2624 and 2626. Control plane 2622 and control units 2624, 2626 may be comparable to CU-CP and CU-UP in FIG. 2. While FIG. 26 shows both the control plane 2622 and control units 2624, 2626 within central unit 2610, as if located with the same unit of a network node, in other embodiments, the control units 2624, 2626 may be located outside the unit where the control plane 2622 resides, or even in another network node. Without regard to the exact arrangement, the processing circuitry 2612 may be considered to be the processing circuitry in one or more network nodes necessary to carry out the techniques described herein for the central unit 2610, whether the processing circuitry 2612 is together in one unit or whether the processing circuitry 2612 is distributed in some fashion.

Figure 29:
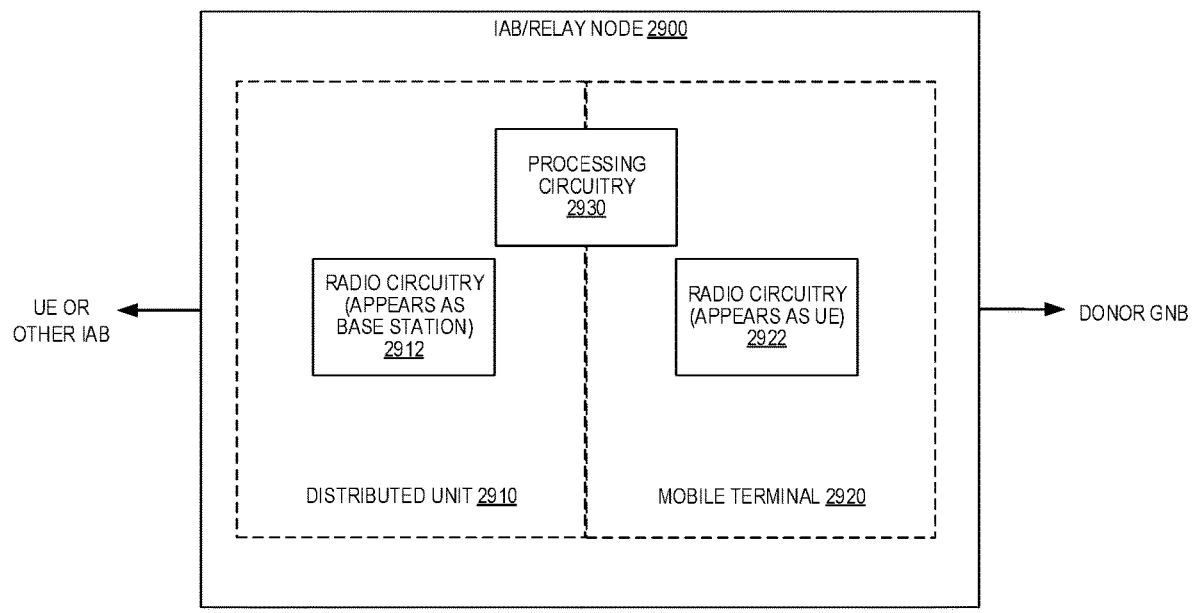
FIG. 29 illustrates an example IAB/relay node in accordance with some embodiments.

FIG. 29 illustrates an exemplary embodiment of an IAB/relay node 2900. The IAB/relay node 2900 may be configured to relay communications between a donor gNB and UEs or other IABs. The IAB/relay node 2900 may include radio circuitry 2912 for facing UEs or other IABS and appearing as a base station to these elements. This radio circuitry 2912 may be considered part of distributed unit 2910. The IAB/relay node 2900 may also include a mobile terminal (MT) part 2920 that includes radio circuitry 2922 for facing a donor gNB. The donor gNB may house the central unit 2610 corresponding to the distributed unit 2910.

The IAB/relay node 2900 may include processing circuitry 2930 that is operatively associated with or controls the radio circuitry 2912, 2922. In an example embodiment, the processing circuitry 2930 comprises one or more digital processors, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuitry 2930 may comprise fixed circuitry, or programmable circuitry that is specially configured via the execution of program instructions implementing the functionality taught herein.

The processing circuitry 2930 also includes or is associated with storage. The storage, in some embodiments, stores one or more computer programs and, optionally, configuration data. The storage provides non-transitory storage for the computer program and it may comprise one or more types of computer-readable media, such as disk storage, solid-state memory storage, or any mix thereof. By way of non-limiting example, the storage comprises any one or more of SRAM, DRAM, EEPROM, and FLASH memory.

In general, the storage comprises one or more types of computer-readable storage media providing non-transitory storage of the computer program and any configuration data used by the base station. Here, "non-transitory" means permanent, semi-permanent, or at least temporarily persistent storage and encompasses both long-term storage in non-volatile memory and storage in working memory, e.g., for program execution.

According to some embodiments, the processing circuitry 2930 of the IAB/relay node 2900, which is adapted to communicate with a central unit 2610 of a donor base station (e.g., gNB) through a distributed unit of the donor base station, the donor base station comprising the central unit and one or more distributed units, with an F1 interface defined between the central unit 2610 and each of the distributed units, is configured to configure an adaptation layer. The processing circuitry 2930 is configured to connect to the donor base station and, after establishing the connection, configure an adaptation layer in a protocol stack for the MT part of the relay node, the adaptation layer providing for routing of incoming packets to one or more further relay nodes or to one or more UEs connected to the IAB/relay node 2900 and for mapping of those incoming packets to bearers. The processing circuitry 2930 is further configured to, after configuring the adaptation layer for the MT part of the relay node, configure an adaptation layer for the distributed unit part of the relay node for forwarding packets exchanged between the central unit of the donor base station and a first further relay node downstream of the relay node.

In some embodiments, the processing circuitry 2930 is configured to perform the method shown in FIG. 34, which will be described in detail below.

Figure 30:
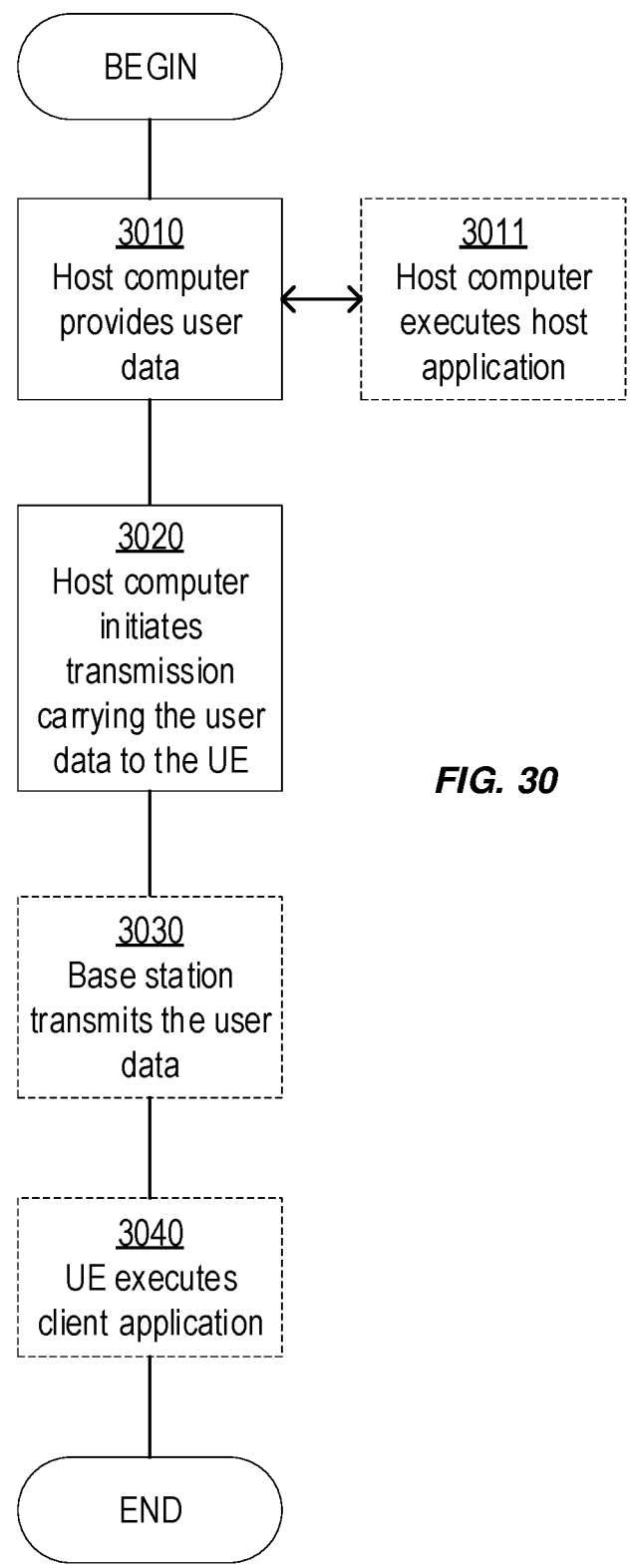
FIGS. 30, 31, 32, and 33 show example methods and/or procedures implemented in a communication system including a host computer, a base station, and a user equipment, in accordance with some embodiments.

FIG. 30 is a flowchart illustrating an exemplary method and/or procedure implemented in a communication system, in accordance with one embodiment. The communication system includes a host computer, a base station and a UE which, in some exemplary embodiments, can be those described with reference to FIGS. 24 and 25. For simplicity of the present disclosure, only drawing references to FIG. 30 will be included in this section. In step 3010, the host computer provides user data. In substep 3011 (which can be optional) of step 3010, the host computer provides the user data by executing a host application. In step 3020, the host computer initiates a transmission carrying the user data to the UE. In step 3030 (which can be optional), the base station transmits to the UE the user data which was carried in the transmission that the host computer initiated, in accordance with the teachings of the embodiments described throughout this disclosure. In step 3040 (which can also be optional), the UE executes a client application associated with the host application executed by the host computer.

Figure 31:
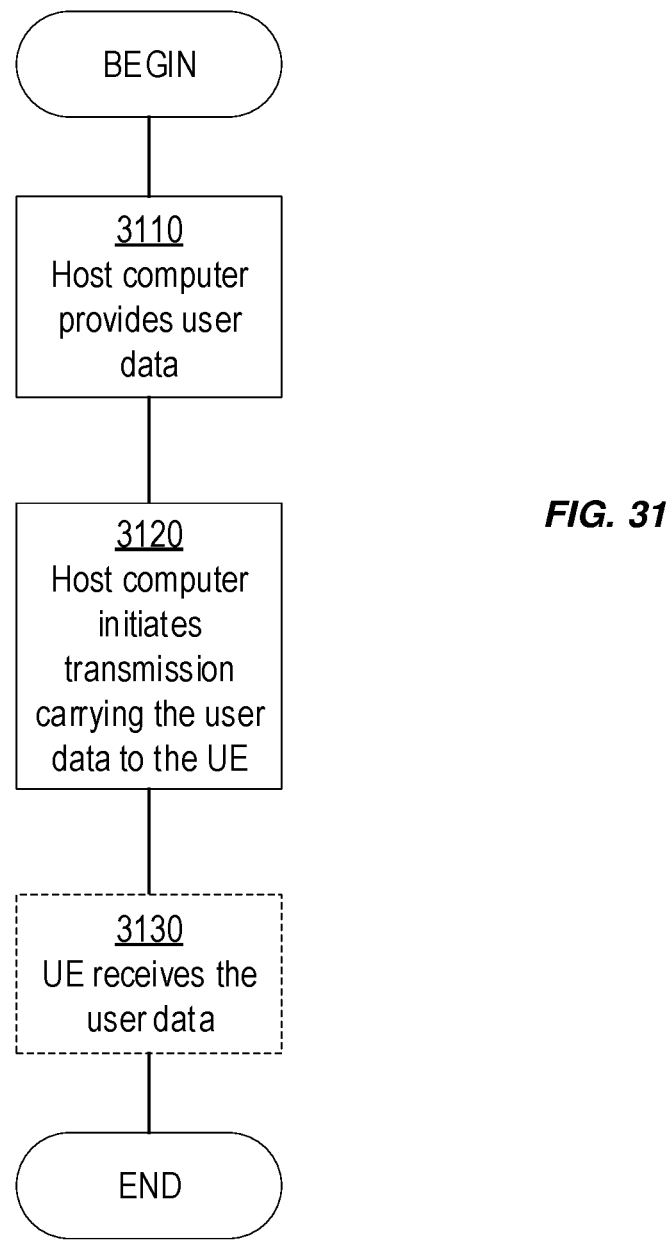

FIG. 31 is a flowchart illustrating an exemplary method and/or procedure implemented in a communication system, in accordance with one embodiment. The communication system includes a host computer, a base station and a UE which can be those described with reference to FIGS. 24 and 25. For simplicity of the present disclosure, only drawing references to FIG. 31 will be included in this section. In step 3110 of the method, the host computer provides user data. In an optional substep (not shown) the host computer provides the user data by executing a host application. In step 3120, the host computer initiates a transmission carrying the user data to the UE. The transmission can pass via the base station, in accordance with the teachings of the embodiments described throughout this disclosure. In step 3130 (which can be optional), the UE receives the user data carried in the transmission.

Figure 32:
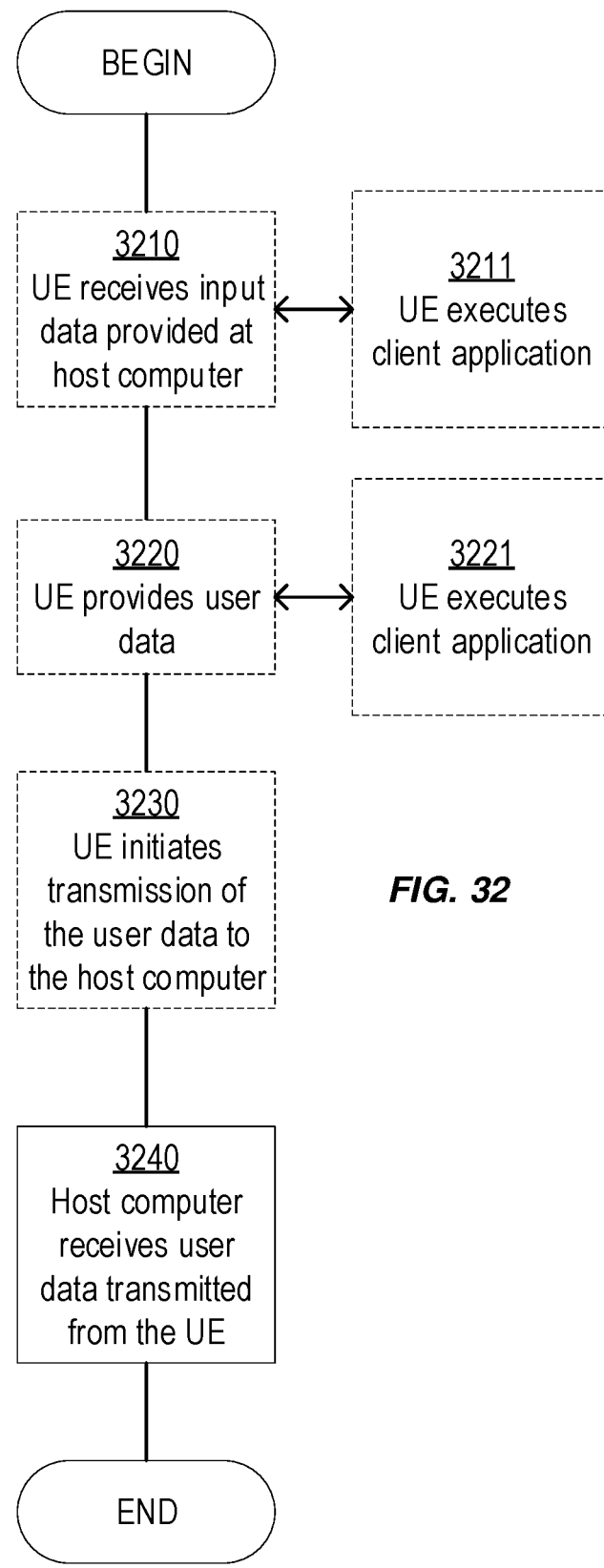

FIG. 32 is a flowchart illustrating an exemplary method and/or procedure implemented in a communication system, in accordance with one embodiment. The communication system includes a host computer, a base station and a UE which can be those described with reference to FIGS. 24 and 25. For simplicity of the present disclosure, only drawing references to FIG. 32 will be included in this section. In step 3210 (which can be optional), the UE receives input data provided by the host computer. Additionally or alternatively, in step 3220, the UE provides user data. In substep 3221 (which can be optional) of step 3220, the UE provides the user data by executing a client application. In substep 3211 (which can be optional) of step 3210, the UE executes a client application which provides the user data in reaction to the received input data provided by the host computer. In providing the user data, the executed client application can further consider user input received from the user. Regardless of the specific manner in which the user data was provided, the UE initiates, in substep 3230 (which can be optional), transmission of the user data to the host computer. In step 3240 of the method, the host computer receives the user data transmitted from the UE, in accordance with the teachings of the embodiments described throughout this disclosure.

Figure 33:
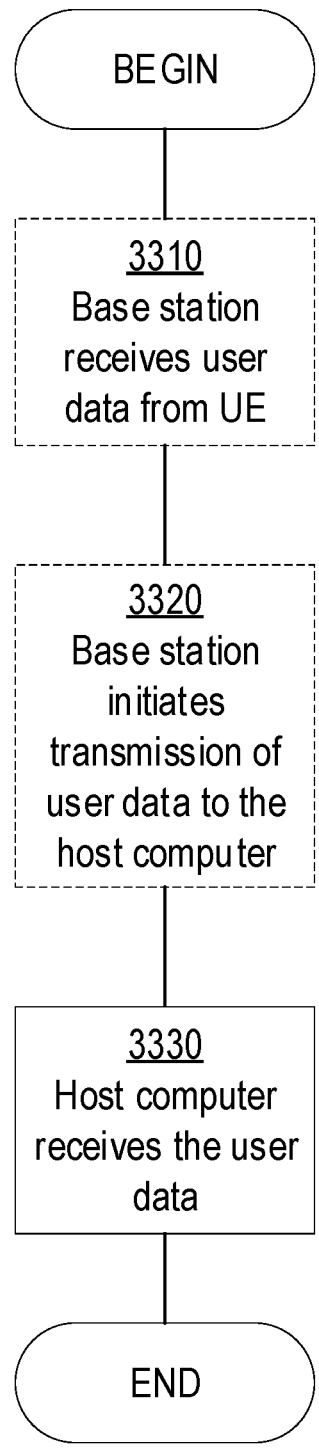

FIG. 33 is a flowchart illustrating an exemplary method and/or procedure implemented in a communication system, in accordance with one embodiment. The communication system includes a host computer, a base station and a UE which can be those described with reference to FIGS. 24 and 25. For simplicity of the present disclosure, only drawing references to FIG. 33 will be included in this section. In step 3310 (which can be optional), in accordance with the teachings of the embodiments described throughout this disclosure, the base station receives user data from the UE. In step 3320 (which can be optional), the base station initiates transmission of the received user data to the host computer. In step 3330 (which can be optional), the host computer receives the user data carried in the transmission initiated by the base station.

Figure 34:
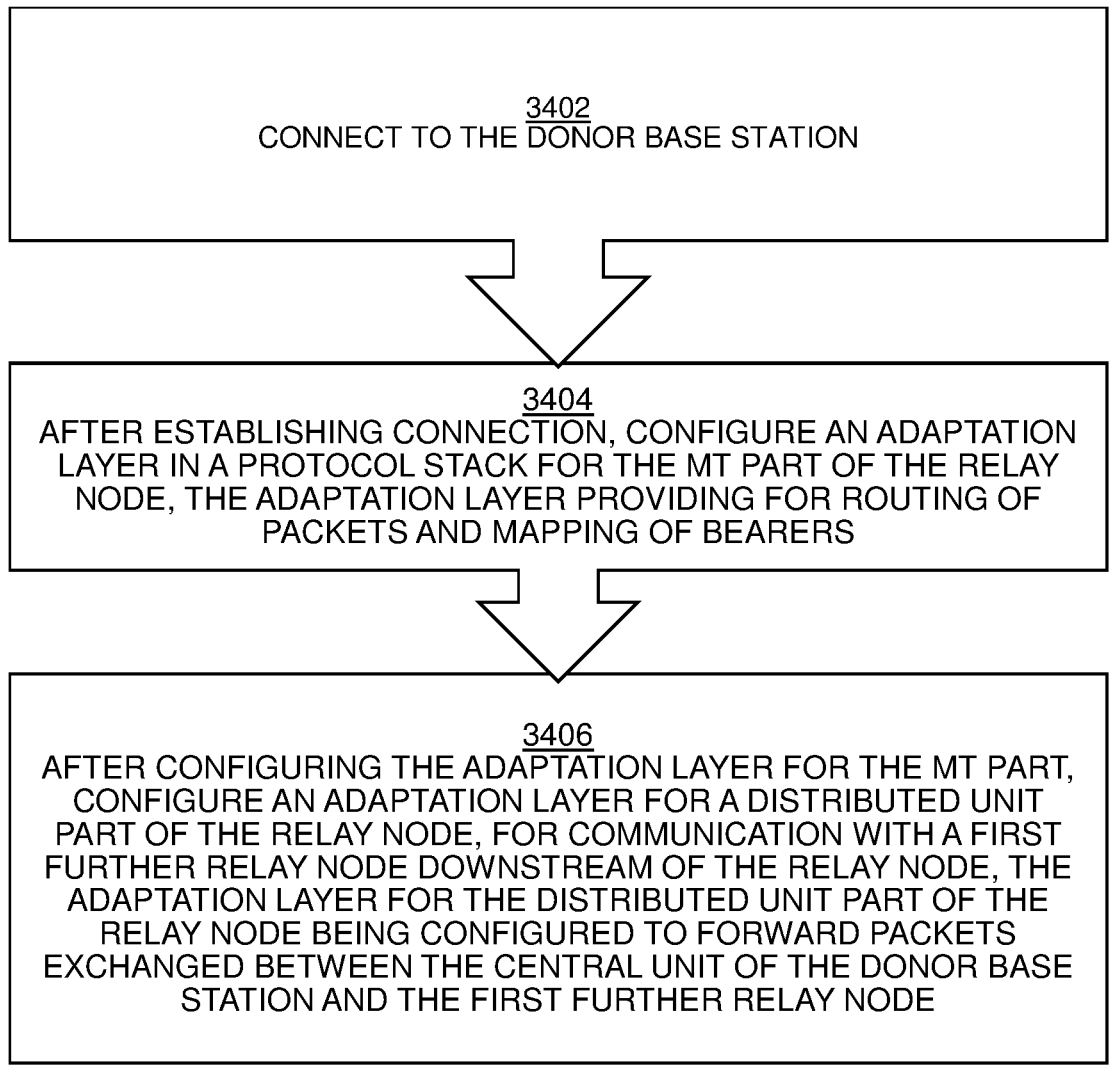
FIG. 34 is a process flow diagram illustrating an example method in an IAB.

FIG. 34 illustrates an exemplary method and/or procedure, in a relay node (e.g., IAB relay node) adapted to communicate with a central unit of a donor base station (e.g., donor gNB) through a distributed unit of the donor base station, in accordance with particular exemplary embodiments of the present disclosure. The donor base station includes the central unit and one or more distributed units, with an F1 interface defined between the central unit and each of the distributed units. Although the exemplary method and/or procedure is illustrated in FIG. 34 by blocks in a particular order, except where indicated otherwise, the order is exemplary and the operations corresponding to the blocks can be performed in different orders and can be combined and/or divided into blocks having different functionality than shown in FIG. 34. Furthermore, exemplary method and/or procedure shown in FIG. 34 can be complementary to other exemplary methods and/or procedures disclosed herein, such that they are capable of being used cooperatively to provide the benefits, advantages, and/or solutions to problems described hereinabove.

The exemplary method and/or procedure begins at block 3402 where the relay node connects to the donor base station, e.g., using radio resource control (RRC) signaling to establish a packet data unit (PDU) session for a mobile terminal (MT) part of the relay node. In block 3404, the relay node, after establishing the connection, configures an adaptation layer in a protocol stack for the MT part of the relay node, the adaptation layer providing for routing of incoming packets to one or more further relay nodes or to one or more UEs connected to the relay node and for mapping of those incoming packets to bearers. In block 3406, the relay node, after configuring the adaptation layer for the MT part of the relay node, configuring an adaptation layer for the distributed unit part of the relay node for forwarding packets exchanged between the central unit of the donor base station and a first further relay node downstream of the relay node.

In some exemplary embodiments, the configuring of the adaptation layer in the protocol stack for the MT part of the relay node is performed using RRC signaling received from the donor base station (e.g., as shown in FIGS. 18-20).

In some exemplary embodiments, the setting up of the adaptation layer for the distributed unit part of the relay node is performed using F1 signaling received from the donor base station, according to an F1 application protocol (F1-AP).

In some exemplary embodiments, the exemplary method shown in FIG. 34 further includes subsequently reconfiguring the adaptation layer for the distributed unit part of the relay node to provide for forwarding packets exchanged between the central unit of the donor base station and a second further relay node downstream of the relay node, using F1 signaling with the central unit of the donor base station. In some further exemplary embodiments, the reconfiguring of the adaptation layer for the distributed unit part of the relay node is performed with a second further relay node connected to the relay node in parallel with the first further relay node. In other further exemplary embodiments, the reconfiguring of the adaptation layer for the distributed unit part of the relay node is performed with respect to a second further relay node connected to the relay node in cascade with and downstream of the first further relay node.

Figure 35:
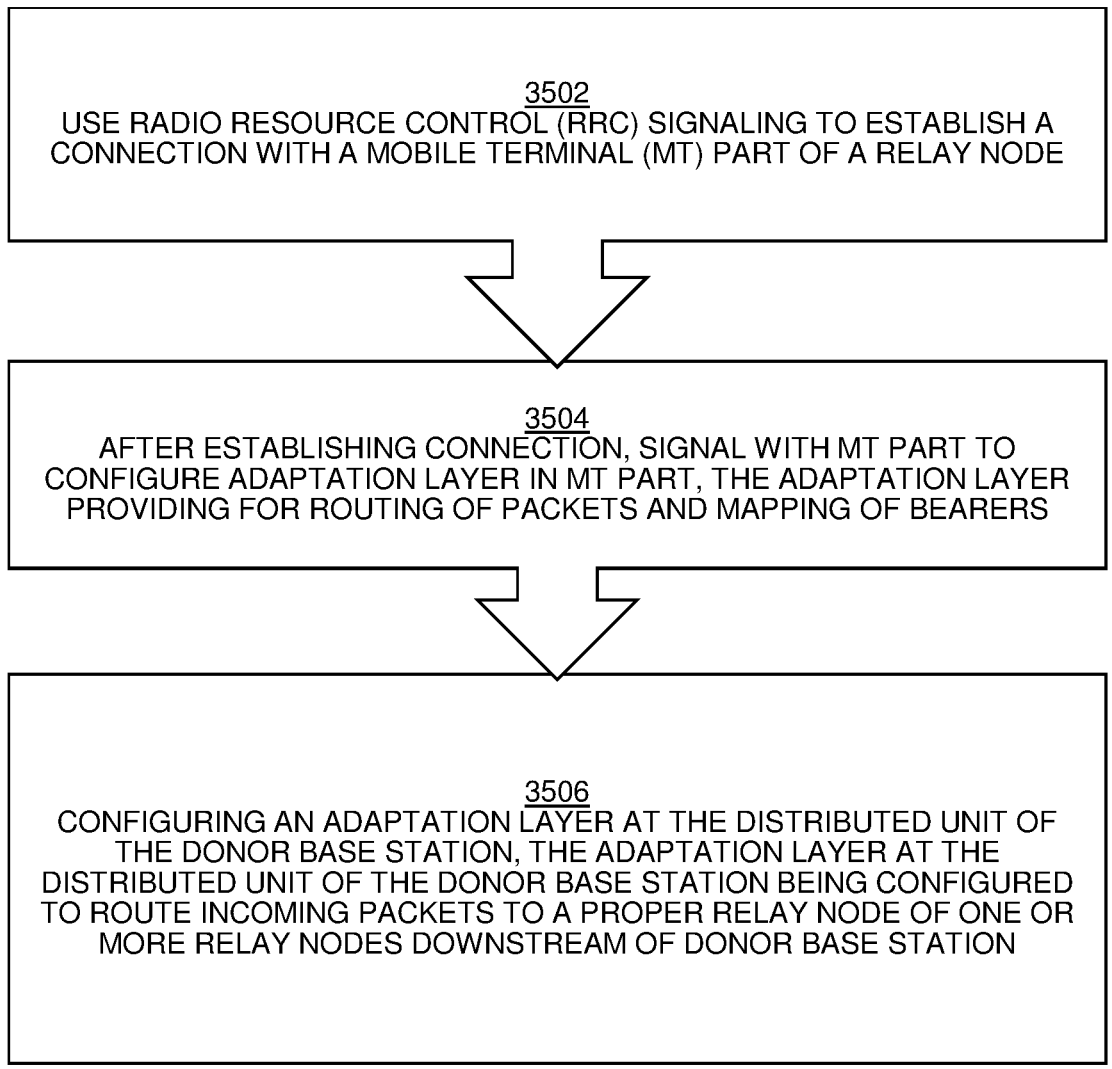
FIG. 35 is a process flow diagram illustrating an example method in a donor base station.

FIG. 35 illustrates an exemplary method and/or procedure, in a central unit of a donor base station (e.g., gNB) that comprises the central unit and one or more distributed units for radio communication with attached nodes, with an F1 interface defined between the central unit and each of the distributed units, for configuring an adaptation layer in a relay node that communicates with the central unit through a distributed unit of the donor base station, in accordance with particular exemplary embodiments of the present disclosure. Although the exemplary method and/or procedure is illustrated in FIG. 35 by blocks in a particular order, except where indicated otherwise this order is exemplary and the operations corresponding to the blocks can be performed in different orders, and can be combined and/or divided into blocks having different functionality than shown in FIG. 35. Furthermore, exemplary method and/or procedure shown in FIG. 35 can be complementary to other exemplary methods and/or procedures disclosed herein, such that they are capable of being used cooperatively to provide the benefits, advantages, and/or solutions to problems described hereinabove.

The exemplary method and/or procedure begins at block 3502 where the central unit uses RRC signaling to establish a connection with a mobile terminal (MT) part of the relay node. At block 3504, the central unit, after establishing the connection, signals with the MT part of the relay node to configure an adaptation layer in a protocol stack for the MT part of the relay node, the adaptation layer providing for routing of incoming packets to one or more further relay nodes or to one or more UEs connected to the relay node and for mapping of those incoming packets to bearers. At block 3506, the central unit, after configuring the F1 adaptation layer for the MT part of the relay node, may configure an adaptation layer at a distributed unit part of the relay node, the adaptation layer at the distributed unit of the donor base station being configured to route incoming packets to a proper relay node of one or more relay nodes downstream of the donor base station.

In some exemplary embodiments, the signaling with the MT part of the relay node to configure the adaptation layer in the protocol stack for the MT part of the relay node is performed using RRC signaling.

In some exemplary embodiments, the signaling with the distributed unit part of the relay node to configure the adaptation layer for the distributed unit part of the relay node is performed using F1 signaling, according to an F1 application protocol (F1-AP).

In some exemplary embodiments, the method includes subsequently reconfiguring the adaptation layer for the distributed unit part of the relay node to provide for forwarding packets exchanged between the central unit of the donor base station and a second further relay node downstream of the relay node, using F1 signaling with the relay node. In some further exemplary embodiments, the reconfiguring of the adaptation layer for the distributed unit part of the relay node is performed with respect to a second further relay node connected to the relay node in parallel with the first further relay node. In other further exemplary embodiments, the reconfiguring of the adaptation layer for the distributed unit part of the relay node is performed with respect to a second further relay node connected to the relay node in cascade with and downstream of the first further relay node.

The term unit can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Example Embodiments

Example embodiments of the techniques and apparatus described herein include, but are not limited to, the following enumerated examples:

1. A method, in a relay node, for configuring an adaptation layer for communicating with a central unit of a donor base station through a distributed unit of the donor base station, the donor base station comprising the central unit and one or more distributed units, with an F1 interface defined between the central unit and each of the distributed units, the method comprising:
   connecting to the donor base station and using radio resource control (RRC) signaling to establish a packet data unit (PDU) session for a mobile terminal (MT) part of the relay node;
   after establishing the PDU session, configuring an adaptation layer in a protocol stack for the MT part of the relay node, the adaptation layer providing for F1 signaling between the central unit of the donor base station and the relay node; and
   after configuring the adaptation layer for the MT part of the relay node, setting up an adaptation layer for a distributed unit part of the relay node, for communication with a first further relay node downstream of the relay node, using F1 signaling with the central unit of the donor base station, the F1 adaptation layer for the distributed unit part of the relay node being configured to forward packets exchanged between the central unit of the donor base station and the first further relay node.

2. The method of example embodiment 1, wherein configuring the adaptation layer in the protocol stack for the MT part of the relay node is performed using RRC signaling.

3. The method of example embodiment 1 or 2, wherein setting up the adaptation layer for the distributed unit part of the relay node is performed using F1 signaling, according to an F1 application protocol (F1-AP).

4. The method of any of example embodiments 1-3, further comprising subsequently reconfiguring the F1 adaptation layer for the distributed unit part of the relay node to provide for communication with a second further relay node downstream of the relay node, using F1 signaling with the central unit of the donor base station.

5. The method of example embodiment 4, wherein reconfiguring the F1 adaptation layer for the distributed unit part of the relay node is performed to provide for communication with the second further relay node connected to the relay node in parallel with the first further relay node.

6. The method of example embodiment 4, wherein reconfiguring the F1 adaptation layer for the distributed unit part of the relay node is performed to provide for communication with the second further relay node connected to the relay node in cascade with and downstream of the first further relay node.

7. A method, in a central unit of a donor base station that comprises the central unit and one or more distributed units for radio communication with attached nodes, with an F1 interface defined between the central unit and each of the distributed units, for configuring an adaptation layer for communicating with a relay node through a distributed unit of the donor base station, the method comprising:
   using radio resource control (RRC) signaling to establish a packet data unit (PDU) session for a mobile terminal (MT) part of the relay node;
   after establishing the PDU session, configuring an F1 adaptation layer in a protocol stack for the MT part of the relay node, the F1 adaptation layer providing for F1 signaling between the central unit of the donor base station and the relay node; and
   after configuring the F1 adaptation layer for the MT part of the relay node, setting up an F1 adaptation layer for a distributed unit part of the relay node, for communication with a first further relay node downstream of the relay node, using F1 signaling with the relay node, the F1 adaptation layer for the distributed unit part of the relay node being configured to forward packets exchanged between the central unit of the donor base station and the first further relay node.

8. The method of example embodiment 7, wherein configuring the F1 adaptation layer in the protocol stack for the MT part of the relay node is performed using RRC signaling.

9. The method of example embodiment 7 or 8, wherein setting up the F1 adaptation layer for the distributed unit part of the relay node is performed using F1 signaling, according to an F1 application protocol (F1-AP).

10. The method of any of example embodiments 7-9, further comprising subsequently reconfiguring the F1 adaptation layer for the distributed unit part of the relay node to provide for communication with a second further relay node downstream of the relay node, using F1 signaling with the relay node.

11. The method of example embodiment 10, wherein reconfiguring the F1 adaptation layer for the distributed unit part of the relay node is performed to provide for communication with the second further relay node connected to the relay node in parallel with the first further relay node.

12. The method of example embodiment 10, wherein reconfiguring the F1 adaptation layer for the distributed unit part of the relay node is performed to provide for communication with the second further relay node connected to the relay node in cascade with and downstream of the first further relay node.

13. A relay node, configured for configuring an adaptation layer for communicating with a central unit of a donor base station through a distributed unit of the donor base station, the donor base station comprising the central unit and one or more distributed units, with an F1 interface defined between the central unit and each of the distributed units, wherein the relay node is configured to perform the method of any of the exemplary embodiments 1-6.

14. A central unit of a donor base station that comprises the central unit and one or more distributed units for radio communication with attached nodes, with an F1 interface defined between the central unit and each of the distributed units, configured for configuring an adaptation layer for communicating with a relay node through a distributed unit of the donor base station, wherein the central unit is configured to perform the method of any of exemplary embodiments 7-14.

15. A computer program comprising instructions that, when executed on at least one processing circuit, cause the at least one processing circuit to carry out the method according to any one of example embodiments 1 to 14.

16. A carrier containing the computer program of example embodiment 15, wherein the carrier is one of an electronic signal, optical signal, radio signal, or computer readable storage medium.

17. A communication system including a host computer comprising:
  processing circuitry configured to provide user data; and
  a communication interface configured to forward the user data to a cellular network for transmission to a user equipment (UE),
  wherein the cellular network comprises a first network node having a radio interface and processing circuitry; and
  the first network node's processing circuitry is configured to perform operations corresponding to any of the methods of embodiments 1-14.

18. The communication system of embodiment 17, further including a user equipment configured to communicate with at least one of the first and second network nodes.

19. The communication system of any of embodiments 17-18, wherein:
  the processing circuitry of the host computer is configured to execute a host application, thereby providing the user data; and
  the UE comprises processing circuitry configured to execute a client application associated with the host application.

20. The communication system of any of embodiments 17-19, further comprising a plurality of further network nodes arranged in a multi-hop integrated access backhaul (IAB) configuration, and configured to communicate with the UE via the first network node.

21. A method implemented in a communication system including a host computer, first network node, and a user equipment (UE), the method comprising:
  at the host computer, providing user data;
  at the host computer, initiating a transmission carrying the user data to the UE via a cellular network comprising the first network node; and
  operations, performed by a first network node, corresponding to any of the methods of embodiments 1-14.

22. The method of embodiment 21, further comprising, transmitting the user data by the first second network nodes.

23. The method of any of embodiments 21-22, wherein the user data is provided at the host computer by executing a host application, the method further comprising, at the UE, executing a client application associated with the host application.

24. The method of any of embodiments 21-23, further comprising operations, performed by a second network node arranged in a multi-hop integrated access backhaul (IAB) configuration with the first network node, corresponding to any of the methods of embodiments 1-14.

25. A communication system including a host computer comprising a communication interface configured to receive user data originating from a transmission from a user equipment (UE) to a first network node comprising a radio interface and processing circuitry configured to perform operations corresponding to any of the methods of embodiments 1-14.

26. The communication system of embodiment 25, further including the first network node.

27. The communication system of embodiments 25-26, further including a second network node arranged in a multi-hop integrated access backhaul (IAB) configuration with the first network node, and comprising radio interface circuitry and processing circuitry configured to perform operations corresponding to any of the methods of embodiments 1-14.

28. The communication system of any of embodiments 25-27, further including the UE, wherein the UE is configured to communicate with at least one of the first and second network nodes.

29. The communication system of any of embodiments 25-28, wherein:
  the processing circuitry of the host computer is configured to execute a host application;
  the UE is configured to execute a client application associated with the host application, thereby providing the user data to be received by the host computer.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, in a relay node, for configuring an adaptation layer, wherein the relay node communicates with a central unit of a donor base station through a distributed unit of the donor base station, the relay node comprising a mobile terminal (MT) part and a distributed unit part, the donor base station comprising the central unit and one or more distributed units, with an F1 interface defined between the central unit and each of the distributed units, the method comprising:
  connecting to the donor base station;
  after establishing the connection, configuring an adaptation layer in a protocol stack for the MT part of the relay node, the adaptation layer providing for routing of incoming packets to one or more further relay nodes or to one or more user equipments (UEs) connected to the relay node and for mapping of those incoming packets to bearers; and
  after configuring the adaptation layer for the MT part of the relay node, configuring an adaptation layer for the distributed unit part of the relay node for forwarding packets exchanged between the central unit of the donor base station and the first further relay node downstream of the relay node.

2. The method of claim 1, wherein configuring the adaptation layer in the protocol stack for the MT part of the relay node is performed using Radio Resource Control (RRC) signaling received from the donor base station.

3. The method of claim 1, wherein configuring the adaptation layer for the distributed unit part of the relay node is performed using F1 signaling received from the donor base station, according to an F1 application protocol (F1-AP).

4. The method of claim 1, further comprising subsequently reconfiguring the adaptation layer for the distributed unit part of the relay node to provide for forwarding packets exchanged between the central unit of the donor base station and a second further relay node downstream of the relay node, using F1 signaling with the central unit of the donor base station.

5. The method of claim 4, wherein the second further relay node is connected to the relay node in parallel with the first further relay node.

6. The method of claim 4, wherein the second further relay node is connected to the relay node in cascade with and downstream of the first further relay node.

7. A method, in a central unit of a donor base station, the donor base station comprising the central unit and one or more distributed units for radio communication with attached nodes, with an F1 interface defined between the central unit and each of the distributed units, for configuring an adaptation layer in a relay node that communicates with the central unit through a distributed unit of the donor base station, the method comprising:
using radio resource control (RRC) signaling to establish a connection with a mobile terminal (MT) part of the relay node, via the distributed unit of the donor base station;
after establishing the connection, signaling with the MT part of the relay node to configure an adaptation layer in a protocol stack for the MT part of the relay node, the adaptation layer providing for routing of incoming packets to one or more further relay nodes or to one or more user equipments (UEs) connected to the relay node and for mapping of those incoming packets to bearers; and
configuring an adaptation layer at the distributed unit of the donor base station, the adaptation layer at the distributed unit of the donor base station being configured to route incoming packets to a proper relay node of one or more relay nodes downstream of the donor base station.

8. The method of claim 7, wherein signaling with the MT part of the relay node to configure the adaptation layer in the protocol stack for the MT part of the relay node is performed using RRC signaling.

9. The method of claim 7, further comprising:
after signaling with the MT part of the relay node to configure the adaptation layer for the MT part of the relay node, signaling with a distributed unit part of the relay node to configure an adaptation layer for the distributed unit part of the relay node for forwarding packets exchanged between the central unit of the donor base station and a first further relay node downstream of the relay node.

10. The method of claim 9, wherein signaling with the distributed unit part of the relay node to configure the adaptation layer for the distributed unit part of the relay node is performed using F1 signaling, according to an F1 application protocol (F1-AP).

11. The method of claim 9, wherein the signaling with the distributed unit part of the relay node to configure the adaptation layer for the distributed unit part of the relay node is performed in response to the first further relay node connecting to the relay node as an MT.

12. The method of claim 9, further comprising subsequently reconfiguring the adaptation layer for the distributed unit part of the relay node to provide for forwarding packets exchanged between the central unit of the donor base station and a second further relay node downstream of the relay node, using F1 signaling with the relay node.

13. The method of claim 12, wherein the second further relay node is connected to the relay node in parallel with the first further relay node.

14. The method of claim 12, wherein the second further relay node is connected to the relay node in cascade with and downstream of the first further relay node.

15. A relay node, for configuring an adaptation layer, the relay node comprising a mobile terminal (MT) part and a distributed unit part and being adapted to communicate with a donor base station comprising a central unit and one or more distributed units, with an F1 interface defined between the central unit and each of the distributed units, the relay node comprising:
first radio circuitry configured to communicate with the donor base station or another relay node between the relay node and the donor base station;
second radio circuitry configured to communicate with one or more user equipments (UEs) or one or more other relay nodes, or both; and
processing circuitry operatively coupled to the first and second radio circuitry and configured to:
connect to the donor base station;
after establishing the connection, configure an adaptation layer in a protocol stack for the MT part of the relay node, the adaptation layer providing for routing of incoming packets to one or more further relay nodes or to one or more UEs connected to the relay node and for mapping of those incoming packets to bearers; and
after configuring the adaptation layer for the MT part of the relay node, configure an adaptation layer for the distributed unit part of the relay node for forwarding packets exchanged between the central unit of the donor base station and a first further relay node downstream of the relay node.

16. The relay node of claim 15, wherein the processing circuitry is configured to configure the adaptation layer in the protocol stack for the MT part of the relay node using RRC signaling received from the donor base station.

17. The relay node of claim 15, wherein the processing circuitry is configured to configure the adaptation layer for the distributed unit part of the relay node using F1 signaling received from the donor base station, according to an F1 application protocol (F1-AP).

18. The relay node of claim 15, wherein the processing circuitry is further configured to subsequently reconfigure the adaptation layer for the distributed unit part of the relay node to provide for forwarding packets exchanged between the central unit of the donor base station and a second further relay node downstream of the relay node, using F1 signaling with the central unit of the donor base station.

19. An apparatus configured for operation as a central unit of a donor base station, wherein the donor base station comprises the central unit and one or more distributed units for radio communication with attached nodes, with an F1 interface defined between the central unit and each of the distributed units, the apparatus comprising:
communication circuitry configured to communicate with the one or more distributed units; and
processing circuitry operatively coupled to the communication circuitry and configured to configure an adaptation layer in a relay node by:
using radio resource control (RRC) signaling to establish a connection with a mobile terminal (MT) part of the relay node, via the distributed unit of the donor base station;
after establishing the connection, signaling with the MT part of the relay node to configure an adaptation layer in a protocol stack for the MT part of the relay node, the adaptation layer providing for routing of incoming packets to one or more further relay nodes or to one or more user equipments (UEs) connected to the relay node and for mapping of those incoming packets to bearers; and configuring an adaptation layer at the distributed unit of the donor base station, the adaptation layer at the distributed unit of the donor base station being configured to route incoming packets to a proper relay node of one or more relay nodes downstream of the donor base station.

20. The apparatus of claim 19, wherein the processing circuitry is configured to signal with the MT part of the relay node to configure the adaptation layer in the protocol stack for the MT part of the relay node using RRC signaling.

21. The apparatus of claim 19, wherein the processing circuitry is further configured to:
after signaling with the MT part of the relay node to configure the adaptation layer for the MT part of the relay node, signal with a distributed unit part of the relay node to configure an adaptation layer for the distributed unit part of the relay node for forwarding packets exchanged between the central unit of the donor base station and a first further relay node downstream of the relay node.

22. The apparatus of claim 21, wherein the processing circuitry is configured to signal with the distributed unit part of the relay node to configure the adaptation layer for the distributed unit part of the relay node using F1 signaling, according to an F1 application protocol (F1-AP).

23. The apparatus of claim 21, wherein the processing circuitry is configured to signal with the distributed unit part of the relay node to configure the adaptation layer for the distributed unit part of the relay node in response to the first further relay node connecting to the relay node as an MT.

24. The apparatus of claim 21, wherein the processing circuitry is further configured to subsequently reconfigure the adaptation layer for the distributed unit part of the relay node to provide for forwarding packets exchanged between the central unit of the donor base station and a second further relay node downstream of the relay node, using F1 signaling with the relay node.

* * * * *